US008583144B2

(12) United States Patent
Kavounas

(10) Patent No.: US 8,583,144 B2
(45) Date of Patent: *Nov. 12, 2013

(54) I-BED FOR COOPERATING PERSONAL ELECTRONIC DEVICE

(75) Inventor: Gregory T. Kavounas, Kirkland, WA (US)

(73) Assignee: Semi Gate L.L.C., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,897

(22) Filed: Nov. 22, 2011

(65) Prior Publication Data
US 2012/0064950 A1 Mar. 15, 2012

Related U.S. Application Data

(63) Continuation of application No. 12/622,845, filed on Nov. 20, 2009, now Pat. No. 8,086,251, and a continuation-in-part of application No. 11/682,675, filed on Mar. 6, 2007, now Pat. No. 7,751,852.

(60) Provisional application No. 61/142,822, filed on Jan. 6, 2009.

(51) Int. Cl.
*H04W 88/02* (2009.01)
*G08B 1/08* (2006.01)

(52) U.S. Cl.
USPC .................................. 455/456.4; 340/539.11

(58) Field of Classification Search
None
See application file for complete search history.

(56) References Cited

U.S. PATENT DOCUMENTS

| 6,240,297 | B1 * | 5/2001 | Jadoul ........................... 455/466 |
| 6,704,580 | B1 | 3/2004 | Fintel |
| 7,493,146 | B1 * | 2/2009 | Delker et al. ................. 455/567 |
| 7,751,852 | B2 * | 7/2010 | Kavounas .................. 455/556.1 |
| 8,086,251 | B2 * | 12/2011 | Kavounas .................. 455/456.4 |
| 8,090,400 | B2 * | 1/2012 | Kavounas .................. 455/550.1 |
| 2006/0116175 | A1 * | 6/2006 | Chu ............................. 455/567 |

* cited by examiner

*Primary Examiner* — Kashif Siddiqui
(74) *Attorney, Agent, or Firm* — Novak Druce Connolly Bove + Quigg LLP

(57) ABSTRACT

An accessory for use with a cooperating portable electronic device (PED) is provided. The accessory includes a station that can support a PED, and also charge it in some embodiments. A cooperating PED transmits an action signal when it receives an incoming call or text. When the station senses the action signal, it further generates a human-perceptible indication to help notify the user, who might have walked away. The human-perceptible indication can include a call sound or a light signal. This way, when the PED is only vibrating, the call sound can be such that the station rings like a regular home telephone. As such, the user can keep the PED at the "Silent" annunciation mode continuously, confident that they will learn about a call, even if they do not have it on their person.

19 Claims, 20 Drawing Sheets

CARRIED MOBILE TELEPHONE
- STANDBY

CARRIED MOBILE TELEPHONE
- RINGING

BODY SUPPORTED ON HORIZONTAL SURFACE

BODY ATTACHED TO WALL

*STATION SUPPORTING PED*

*STATION SUPPORTING PED – TENSION BY MOVABLE MEMBER*

*BODY INCLUDES CAVITY*

*CAVITY HAS SHAPE DESIGNED TO RECEIVE PED SNUGLY*

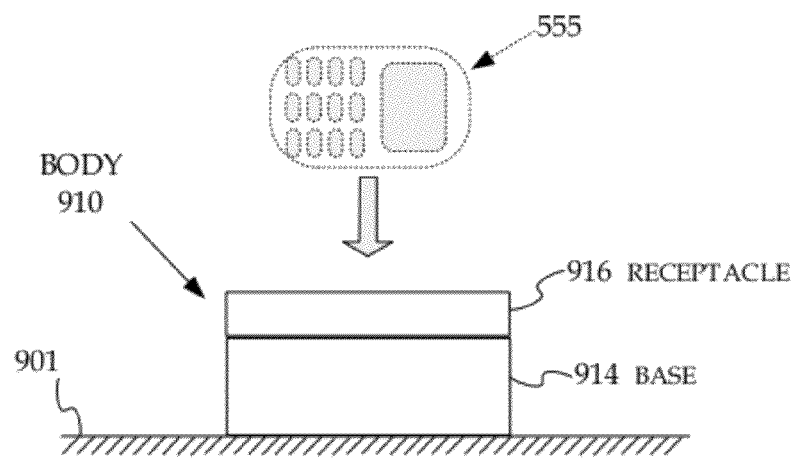
FIG. 9  *RECEPTACLE ON TOP SIDE OF BASE*
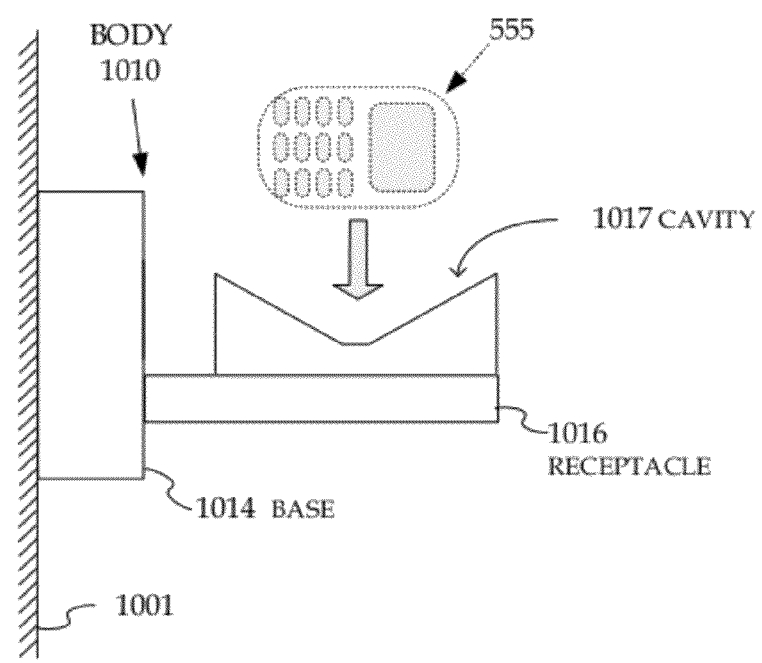
FIG. 10  *RECEPTACLE AT THE SIDE OF BASE*

NOTIFYING STATION FOR SUPPORTING PORTABLE ELECTRONIC DEVICE

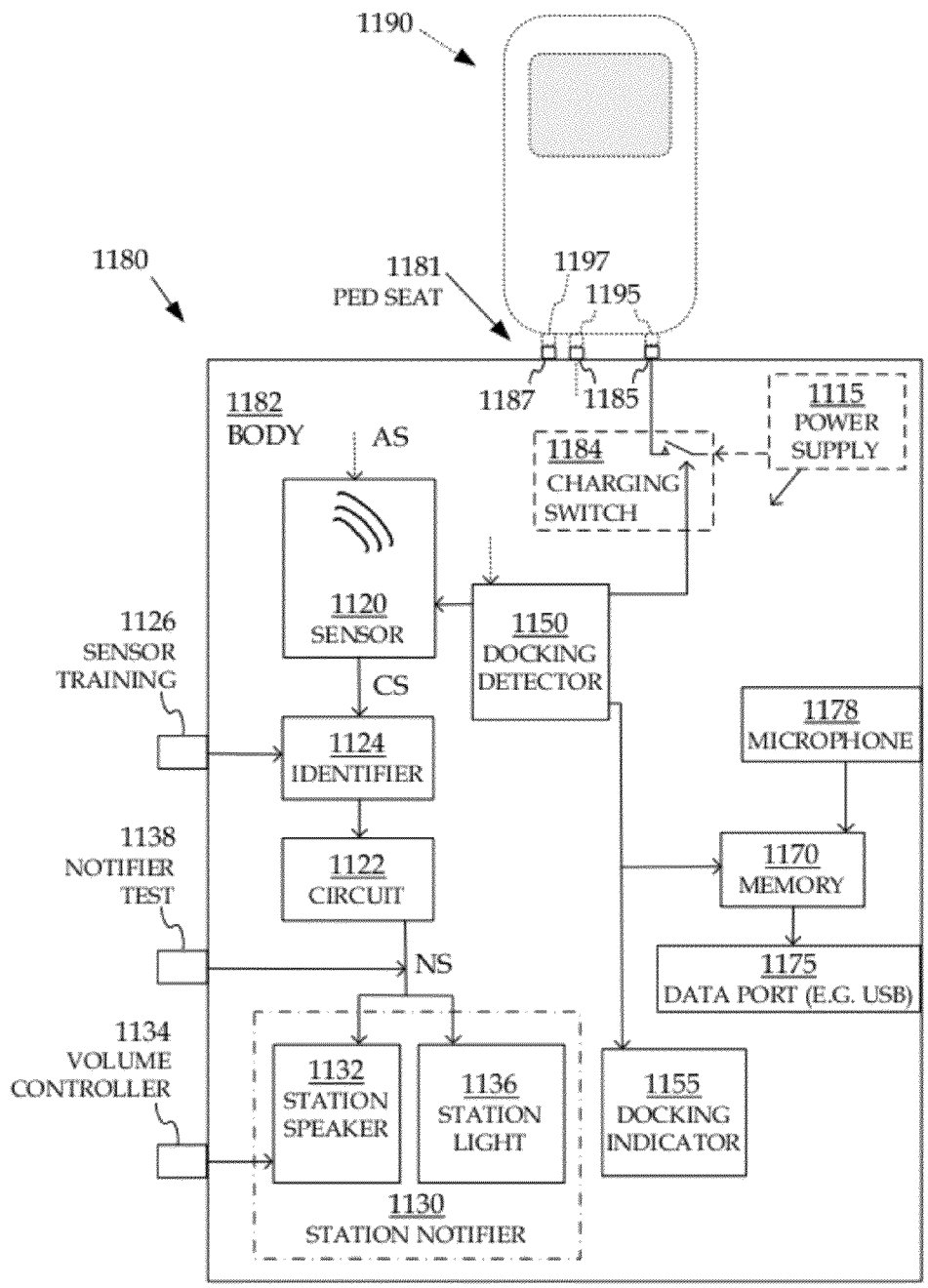
FIG. 11B    NOTIFYING STATION FOR SUPPORTING PORTABLE ELECTRONIC DEVICE SUPPORTED MOBILE TELEPHONE – VIBRATING
NOTIFIER IS SPEAKER,
AND STATION IS ALSO RINGING SUPPORTED MOBILE TELEPHONE – VIBRATING
NOTIFIER IS LIGHT,
AND STATION IS ALSO LIGHTING UP

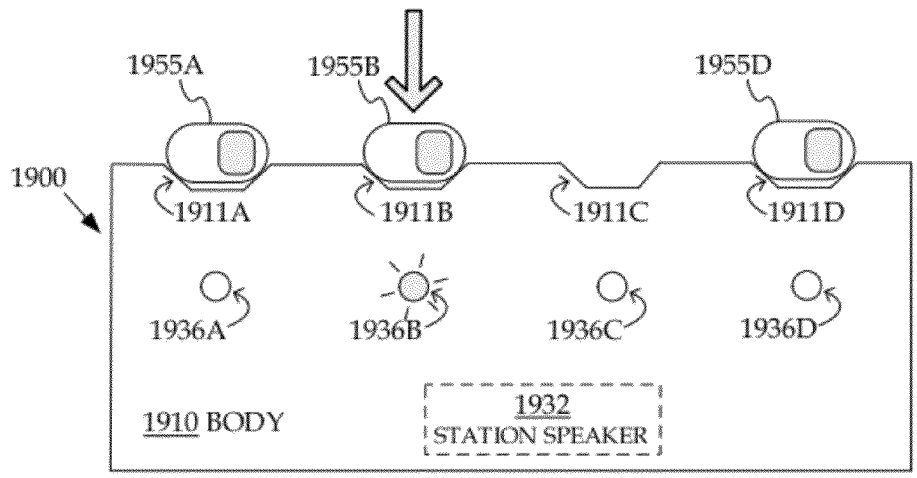
FIG. 19A  *MULTI-SEAT NOTIFYING STATION*
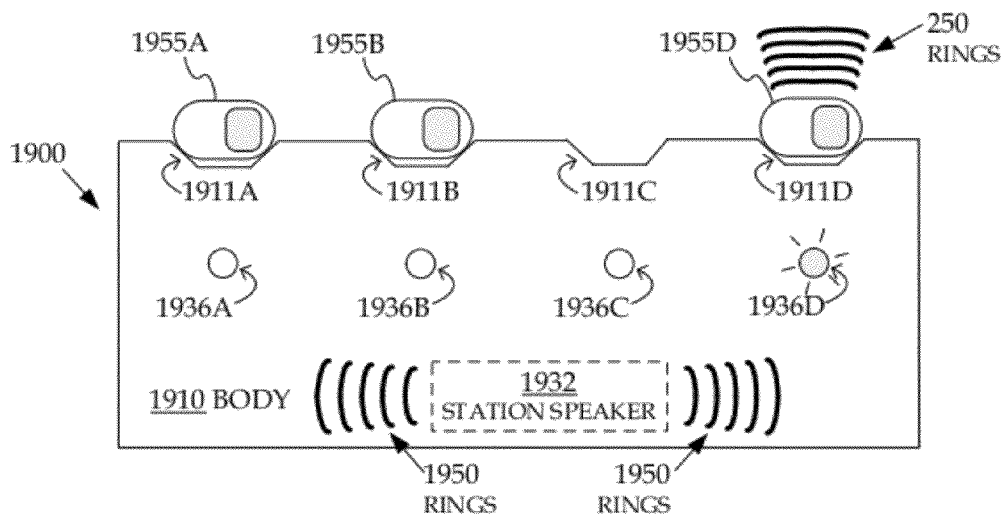
FIG. 19B  *MULTI-SEAT NOTIFYING STATION*

I-BED FOR COOPERATING PERSONAL ELECTRONIC DEVICE

CROSS REFERENCE TO RELATED PATENT APPLICATIONS

This is a continuation application of patent application Ser. No. 12/622,845 filed Nov. 20, 2009, titled "NOTIFYING STATIONS FOR PORTABLE ELECTRONIC DEVICES AND METHODS," which issued as U.S. Pat. No. 8,086,251 on Dec. 27, 2010, which application claims the benefit of U.S. Provisional Application No. 61/142,822 filed Jan. 6, 2009, titled "NOTIFYING STATIONS FOR PORTABLE ELECTRONIC DEVICES AND METHODS." U.S. patent application Ser. No. 12/622,845 is also a continuation-in-part of U.S. patent application Ser. No. 11/682,675, filed on Mar. 6, 2007, and entitled "NOTIFYING STATIONS FOR PORTABLE ELECTRONIC DEVICES AND METHODS," which issued as U.S. Pat. No. 7,751,852 on Jul. 6, 2010. All of these patent applications are hereby incorporated by reference in their entirety for all purposes.

BACKGROUND OF THE INVENTION

1. Field of the Invention

The present invention is related to the field of accessories for Portable Electronic Devices (PEDs) such as cellphones and PDAs, and more specifically to devices and methods for supporting a PED and notifying a user who may not longer be carrying the PED.

2. Description of the Related Art

Portable Electronic Devices (PEDs) such as cell phones, personal digital assistants (PDAs), and the like are proliferating. A number of them can perform wireless communication, such as permit the user to conduct a telephone conversation, exchange emails or text messages, and so on. Such activities are often via an interface of the device, which can conduct a dialogue with the user, and so on.

In a number of instances, these activities start with an event, such as a PED receiving a telephone call, or receiving an email or text message. For these instances, PEDs notify the users of the event, such as by producing a sound or a vibration, depending on the annunciation mode that the user has chosen. Examples are now described.

FIG. 1 is a diagram of a mobile telephone 100, as it might be carried on a belt 110 of a user (not shown). Mobile telephone 100 is on standby, meaning that it is on, but the user is not using it to conduct a wireless telephone call. Mobile telephone 100 can be set in any annunciation mode 136, which can be either to ring ("Normal"), or to vibrate ("Silent"), if it is to notify its user that it received a wireless signal.

FIG. 2 is a diagram of mobile telephone 100, while receiving a telephone call via a wireless signal 240. For purposes of FIG. 2, mobile telephone 100 has been placed by the user in a "Normal" annunciation mode 236, and therefore rings 250 to notify the user. Ringing 250 can be by generating a ring tone.

This ringing 250 has been undesirable in some settings, where people must keep quiet. These settings are not just theaters, but sometimes also the workplace. For example, ring tones alone can distract coworkers. Accordingly, the "Silent" annunciation mode has been implemented, as described below.

FIG. 3 is a diagram of mobile telephone 100, while receiving a telephone call via a wireless signal 340. For purposes of FIG. 3, mobile telephone 100 has been placed by the user in a "Silent" annunciation mode 336, and therefore it vibrates 350 to notify the user, instead of ringing.

PEDs permit the user to change the annunciation mode, from "Normal" 236 to "Silent" 336 and back. So, nominally, they can change it to "Silent" 336 every time they enter a place where they have to keep quiet, and back to "Normal" 236 every time they exit such a place.

A problem arises from the fact that it is the user who is required to keep transitioning the PED between the different annunciation modes. Sometimes they forget, resulting in embarrassment if their phone rings when it should not. Others give up, especially when they realize that they can still perceive the vibration, and do not need the ringing of the "Normal" annunciation mode 236. So, they just leave the phone in the "Silent" annunciation mode 336. When they go home, they turn it off, and instead rely on the land line of the home telephone for their telephone conversations.

In some instances, however, they forget to turn off the mobile telephone. As seen in FIG. 4, mobile telephone 100 has been left on a surface 401, such as a table or a desk. Upon receiving a signal 440, mobile telephone 100 vibrates 350 to notify the user. But the user could have walked to another room, and will miss the call because they will not feel the vibration or hear a ringing.

BRIEF SUMMARY

Generally, embodiments herein provide accessories for one or more portable electronic devices (PEDs), and related methods. These accessories are also known as stations for the PEDs. In some embodiments, a station supports a PED, and senses an action signal generated by the PED, when the PED would be notifying its user about a wireless signal that is received from a remote transmitter. When the station so senses, it further generates a human-perceptible indication to help notify the user, who might have walked away. The human-perceptible indication can include, for example, a call sound, a light signal, etc. The station can also transmit station signals to the PED, such as status signals, and so on.

Embodiments herein further provide PEDs that transmit PED signals intended for such stations. The PED signals include action signals, a docking signal, and others for their communication.

In some embodiments, the call sound can be such that the station can ring like a regular home telephone when the PED is only vibrating. The user can thus keep the PED at the "Silent" annunciation mode, without having to remember to change the mode every time they leave the PED on the station, and every time they take it back. Therefore, it would be less necessary for a user to have a separate telephone line for the home, at least for voice communications. And since they can take the mobile telephone with them when they leave, they need have, and pay for, only one telephone number.

In some embodiments, the light signal can be such that the station lights up when the PED is only vibrating. This way, coworkers will be distracted less.

Stations according to optional embodiments can be also stations for charging a battery of the PED. Charging can be via wires or wirelessly.

The invention will become more readily apparent from the following Detailed Description, which proceeds with reference to the drawings, in which:

BRIEF DESCRIPTION OF THE DRAWINGS

FIG. 9 is a diagram of a station according to embodiments where the body has a base and a receptacle for supporting a PED.

FIG. 10 is a diagram of a station according to embodiments where the body has a base and a receptacle for supporting a PED.

FIG. 11B is a block diagram of components of a station for supporting a PED according to other optional embodiments of the invention.

FIG. 19A is a diagram of a sample four-seat embodiment, which has two PEDs docked on it, and a third PED is being placed on it.

FIG. 19B is a diagram of the embodiment of FIG. 19A, at a later time during which one of the docked PEDs is receiving a call.

DETAILED DESCRIPTION

As has been mentioned, the present invention provides stations cooperating with one or more portable electronic devices (PEDs). The invention is now described in more detail.

Figure 1:
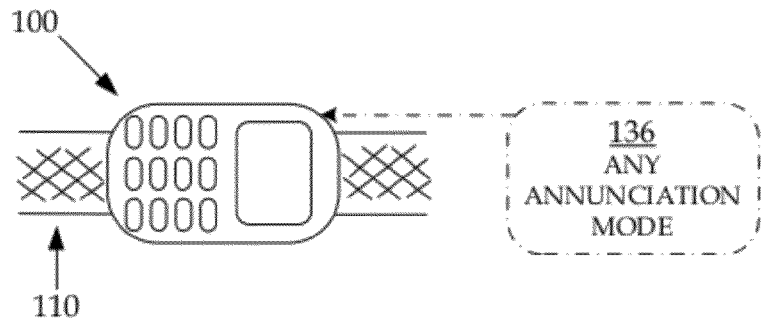
FIG. 1 is a diagram of a mobile telephone, as it might be carried by a user.
Figure 2:
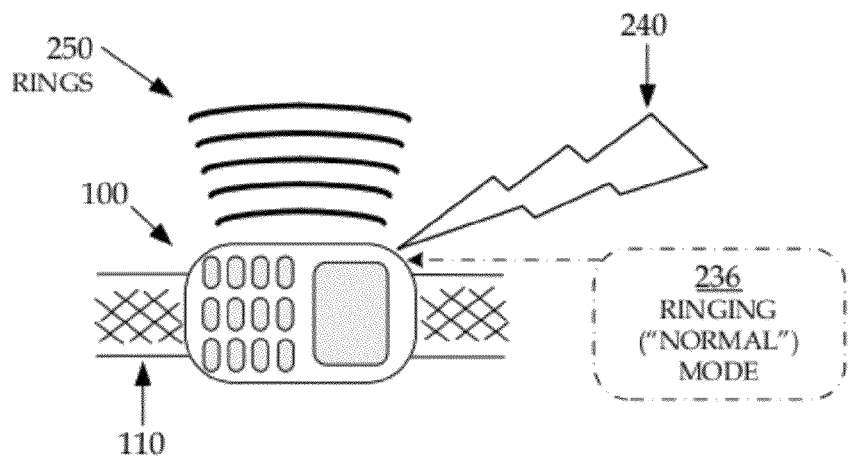
FIG. 2 is a diagram of the mobile telephone of FIG. 1 in a "Normal" annunciation mode, while receiving a telephone call, and ringing to notify the user.
Figure 3:
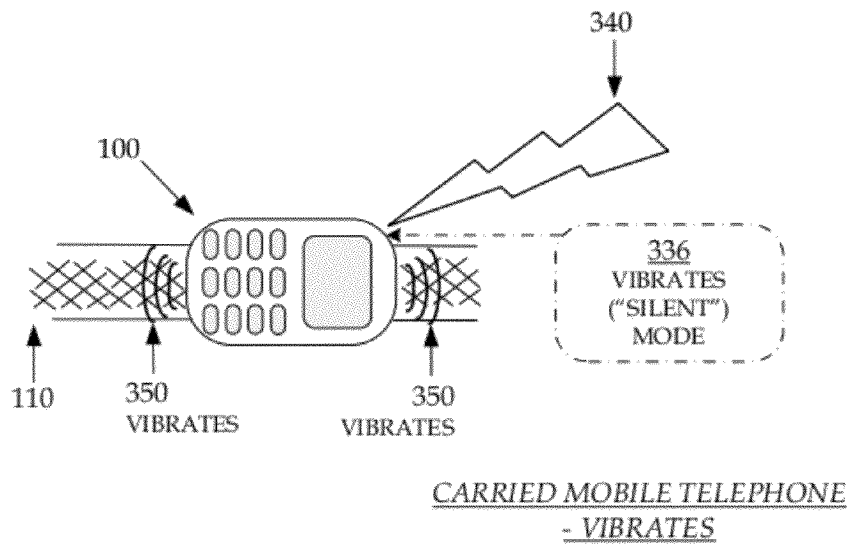
FIG. 3 is a diagram of the mobile telephone of FIG. 1 in a "Silent" annunciation mode, while receiving a telephone call and vibrating to notify the user.
Figure 4:
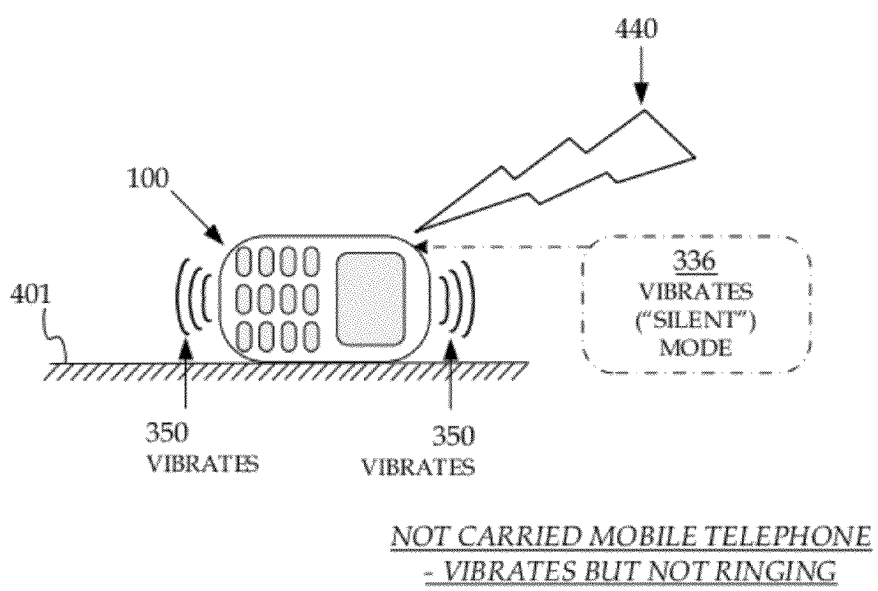
FIG. 4 is a diagram of the mobile telephone of FIG. 1, in the "Silent" annunciation mode of FIG. 3, while it is no longer carried, and receiving a telephone call and vibrating.
Figure 5A:
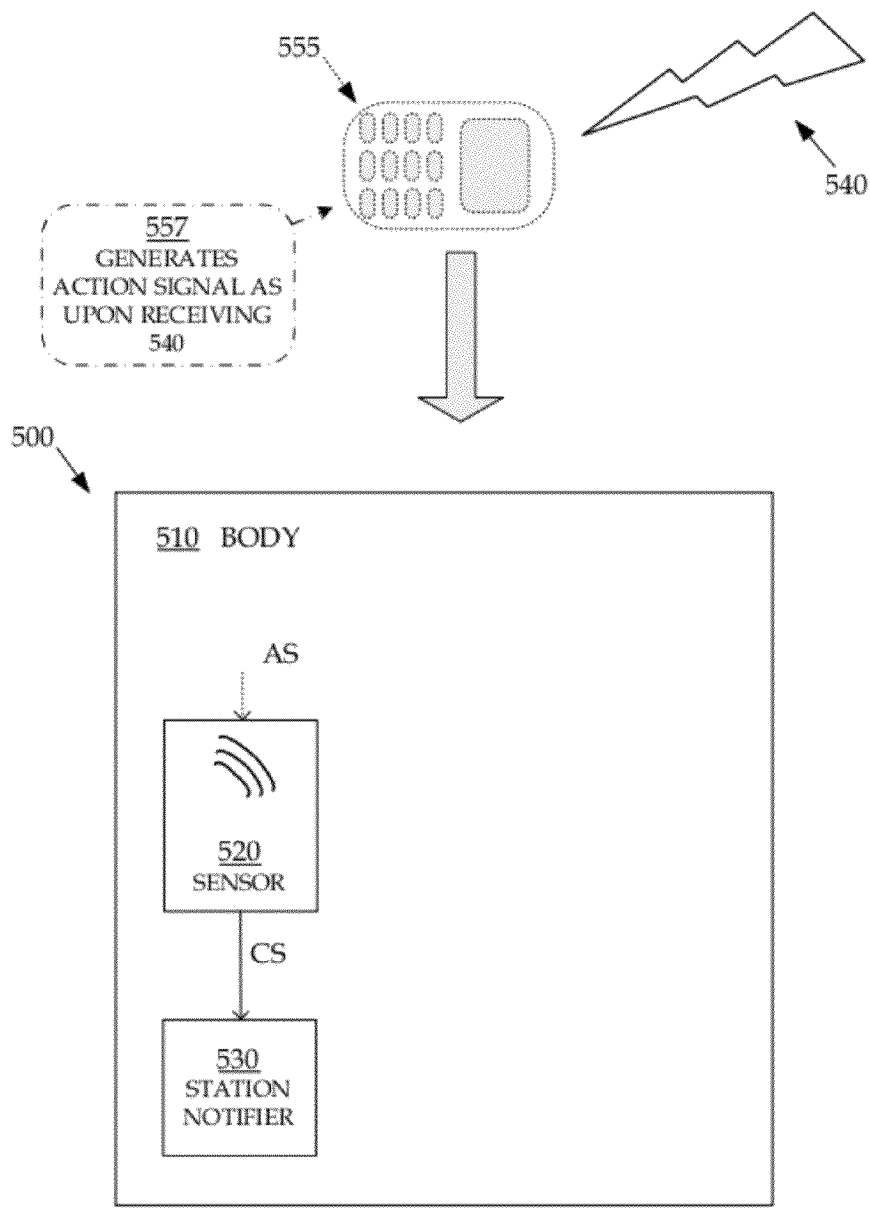
FIG. 5A is a block diagram of components of a station for supporting a Portable Electronic Device (PED) according to embodiments of the invention.

Referring now to FIG. 5A, a set of components is shown for a station 500 made according to embodiments. Station 500 is for a Portable Electronic Device (PED) 555, which can be as a mobile telephone, a Personal Digital Assistant, and so on. PED 555 can be made either according to the prior art, or according to embodiments. Station 500 can also be called a calling docking station 500 or simply a calling dock 500 for PED 555.

PED 555 includes an antenna operable to receive a wireless signal 540, such as in conjunction with receiving a telephone call or a text message. The wireless signal is received from a remote transmitter, such as those used by telephone companies for mobile telephones. Those transmitters can be hundreds or a few thousands of feet away from PED 555. As such, PED 555 does not receive the wireless signal from station 500 itself, in other words, station 500 is not the base of a home telephone that is portable.

PED 555 also includes a PED mechanism to operate for notifying a user about the received wireless signal. The PED mechanism can include a vibration mechanism for causing a vibration, or a PED speaker for generating a ring tone, or both.

In addition, according to comment 557, PED 555 is able to generate an action signal responsive to receiving wireless signal 540. This action signal is not perceptible by humans. Various examples of the action signal are described later in this document.

Station 500 includes a body 510 for supporting PED 555. Body 510 can be made in a number of ways, as will be seen later in this document.

Station 500 also includes a sensor 520. Sensor 520 can be provided separately from body 510. In the preferred embodiment, however, sensor 520 is incorporated within body 510. It can be incorporated as a separate device, or as part of a circuit that is described later in this document.

Sensor 520 is adapted to sense the generation of the action signal. In addition sensor 520 is adapted to output a call signal CS responsive to so sensing. Sensor 520 may be made in any number of ways, especially with a view to better and more reliably sensing the operation of the PED mechanism. These ways are correlated with the nature of the action signal that is sensed. Various examples are now described.

In general, the action signal can be a signal transmitted by prior art PEDs, which is sensed by sensor 520. In some embodiments, PEDs are made according to the invention, which transmit custom action signals to further control stations made according to embodiments. In addition, while signals are described individually, that is only for convenience. In fact, a single PED can transmit more than one action signals, which can be of the same or different nature, dimension, timing, and so on.

In some embodiments, the action signal is a wireless signal. Its generation can be sensed by a wireless detector. In others, the action signal is wired, and its generation is sensed via at least one electrical contact between the sensor and the PED.

In some embodiments, the action signal is transmitted by the PED. In some embodiments, the generation of the action signal is sensed by the sensor sensing directly the action signal.

In other embodiments, the generation of the action signal is sensed by the sensor indirectly. In other words, the generation of the action signal is not sensed itself, but one of its results is sensed. In some of these embodiments, the action signal is generated internally by the PED.

In one embodiment, as will be seen later in this document, the PED has a battery that is being charged by the station. Charging presents an input impedance to the station. The action signal causes a modulation on the input impedance. This applies whether charging is via conductors, or inductive.

Sample time profiles of the action signal are now described. It will be appreciated that the signal serving as the action signal is one that can be used by sensor 520. It can be an existing signal of an existing PED, or it can be a PED made according to embodiments with a custom signal for controlling the station.

Figure 5B:
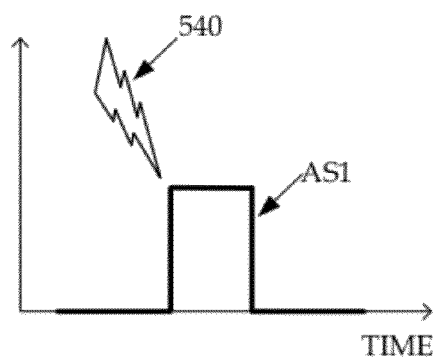
FIG. 5B is a diagram of a first sample time profile of an action signal generated by a PED of FIG. 5A.

FIG. 5B is a diagram of a first sample time profile of an action signal AS1, which can be generated by PED 555. Action signal AS1 is not being generated prior to receiving wireless signal 540—in fact it has a value of zero. Upon sensing wireless signal 540, action signal AS1 is generated.

In some embodiments, the PED generates a host signal that is not dependent on receiving the wireless signal. In these, the action signal is a modulation superimposed on the host signal. An example is now described.

Figure 5C:
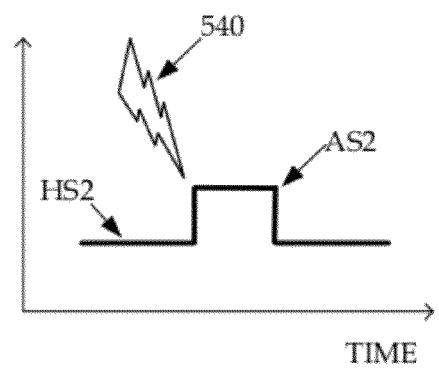
FIG. 5C is a diagram of a second sample time profile of an action signal generated by a PED of FIG. 5A.

FIG. 5C is a diagram of a second sample time profile of an action signal AS2, which can be generated by PED 555. A host signal HS2 has a nonzero value prior to wireless signal 540 being received. A modulation AS2 is superimposed on host signal HS2, upon sensing wireless signal 540. In this example, modulation AS2 is positive, but it could be negative as well.

In some embodiments, it is desired that there be prematching between a PED and a station according to embodiments. In those, the action signal can encode a message. A station notifier, which will be described later in this document, can generate the human-perceptible indication only if the message meets a preset criterion. Or it can activate a custom feature, and so on. An example is now described.

Figure 5D:
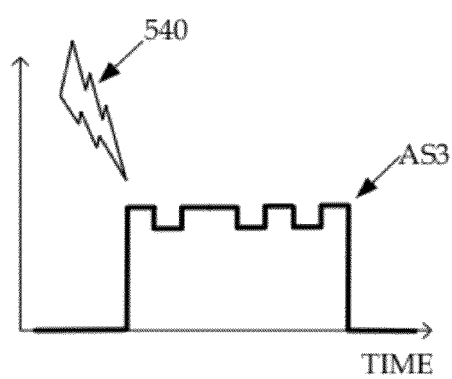
FIG. 5D is a diagram of a third sample time profile of an action signal generated by a PED of FIG. 5A.

FIG. 5D is a diagram of a third sample time profile of an action signal AS3, which can be generated by PED 555. Action signal AS3 encodes a message in variations. The message can be one of identification between the PED and the station. Performance, in whole or in part, can be predicated on the identification being successful. Or the message can be one of invoking a custom ringing feature as the human-perceptible indication, for example if the PED needs charging. This can be performed without the PED spending its little remaining charge ringing.

In some embodiments, the message is one of at least two possible messages. The human-perceptible indication is different, depending upon which of the two messages is encoded. An example is now described.

Figure 5E:
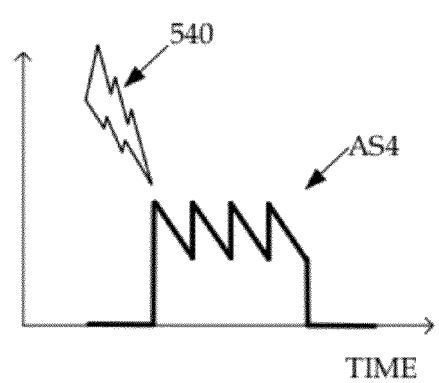
FIG. 5E is a diagram of a fourth sample time profile of an action signal generated by a PED of FIG. 5A.

FIG. 5E is a diagram of a fourth sample time profile of an action signal AS4, which can be generated by PED 555. Action signal AS4 includes a falling-sawtooth wave that could cause a first type of ringing by the station. A rising-sawtooth wave could cause a first type of ringing by the station, and so on.

In all these examples, the action signal was sudden, which can be detected easily by detector 520. This is preferred, but not required. For example, the action signal can have a time profile that rises slowly, or stays above a low threshold for some time, and sensor 520 can include an integrator that captures the difference over time. Plus, an action signal according to embodiments can include elements of all these profiles.

Returning to FIG. 5A, station 500 also includes a station notifier 530. Station notifier 530 can be made so that it generates a human-perceptible indication, responsive to call signal CS. As will be seen in more detail later in this document, in some embodiments station notifier 530 can include a station speaker, in which case the human-perceptible further indication includes a call sound. In other embodiments, station notifier 530 can include a station light, in which case the human-perceptible indication includes a light signal. Moreover, notifier 530 can include a combination of two or more of these and other items, and so one.

Station notifier 530 can be provided separately from body 510. In the preferred embodiments, however, a station speaker is incorporated within body 510, while a station light is provided at a surface of body 510.

As has already been mentioned, body 510 can be made in any number of ways and configurations. Some configurations are for body 510 to be standalone, or be placed in a home. In other configurations, body 510 can be, along with its supported PED, in a briefcase or a lady's purse, or an automobile. Body 510 can be standalone, for taking in and out of the briefcase or purse or automobile, or be integrated with the briefcase or purse or automobile. In these configurations, body 510 is preferably made such that it will host PED 555 more securely, without letting it fall off, if the briefcase or purse or automobile moves suddenly.

For constructing body 510, materials include, by way of example and not of limitation, plastics and metal, and in general materials similar to those for making home telephones. Two main configurations are now described.

Figure 6:
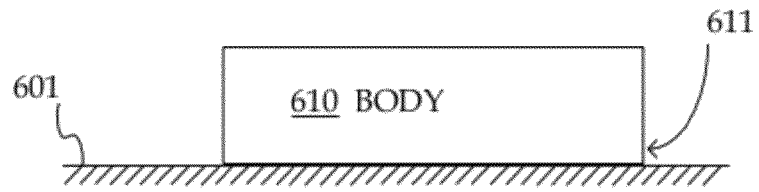
FIG. 6 is a diagram of a station according to embodiments that have a body with an underside suitable for being supported on a horizontal surface.

Referring to FIG. 6, a body 610 of a station according to an embodiment includes an underside 611 that has a substantially flat portion. As such, body 610 can be supported on a horizontal surface 601, which can be a kitchen counter, a night stand, a table top, or any surface someone might place a home telephone on. In the embodiment of FIG. 6, the entire underside 611 is flat, but that is not necessary.

In some embodiments, not shown in FIG. 6, underside 611 also includes feet, which can be made from rubber, plastic or other suitable material. The feet prevent body 610 from sliding on, or scratching surface 601.

Figure 7:
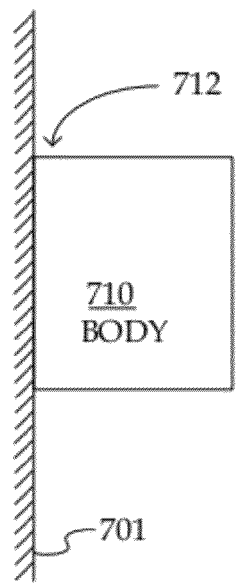
FIG. 7 is a diagram of a station according to embodiments that have a body adapted to be hung on a wall.

Referring to FIG. 7, a body 710 of a station according to an embodiment includes a feature 712 for hanging base 710 on a wall 701. Feature 712 can be made in any number of ways, some learned from how home telephone devices are made. For example, feature 712 can be a hole for nailing a nail therethrough, or for anchoring body 710 at the head of a screw.

Referring back to FIG. 5A, and as mentioned above, body 510 can be made in any number of ways, for supporting PED 555. A number of such ways are now described. Other portions of this document, which describe other aspects of the invention, may ionically show a PED simply on a station, but that is only by way of example, and not of limitation. In those portions, it is meant that the PED maybe supported by the station in any number of ways.

In most embodiments, the station defines explicitly a PED space for the PED to be received at. Where it is so defined, the PED space can also be called a "PED seat", or simply "seat". The PED seat can be designed with a view to sensing the action signal, and so on. The seat can even have a drawing or instruction, explicit or implicit, for suggesting placing PED 555 there. In some embodiments, the placement will be suggested by the shape or configuration of the PED seat, and of the remainder of the device.

Figure 8A:
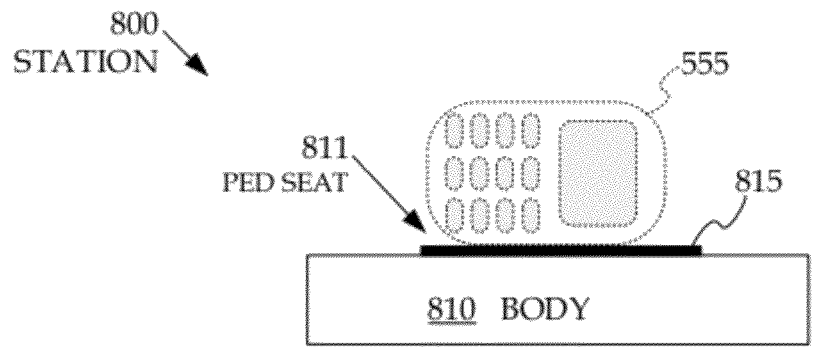
FIG. 8A is a diagram of a station according to embodiments where the body supports a PED on a top side.

FIG. 8A is a diagram of a station 800 according to an embodiment. Station 800 has a body 810, with a designated PED seat 811 for supporting PED 555. Seat 811 is on a top surface of body 810, which is substantially flat. PED 555 is held in seat 811 by friction, for example by a rubber surface 815 on seat 811. Rubber surface 815 prevents PED 555 from displacing itself off of seat 811, as it vibrates. In addition, if station 800 includes also a charger for PED 555, rubber surface 815 is shaped so that it does not get in the way of charging.

Another set of station embodiments hold PED 555 to the station by tension. The tension can be implemented by spring loading, snug fit, and so on. These embodiments are particularly suitable where the station of the invention may be moved, as is the case when the station will be in a briefcase, in a lady's purse, or in an automobile. Examples are now described.

Figure 8B:
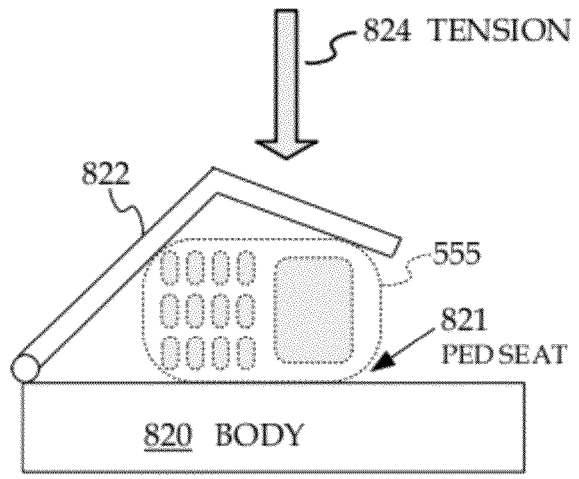
FIG. 8B is a diagram of a station body according to embodiments where the body supports a PED by tension.

FIG. 8B is a diagram of a station body 820 according to an embodiment. A movable member 822 secures PED 555 to body 820, at least in part. Member 822 is either a cover, or an arm, and so on. In the shown embodiment, member 822 exerts a tension 824 so as to bias PED 555 towards PED seat 821 of body 820. Member 822 can be spring loaded. In other embodiments, member 822 can clasp with a portion of body 820. In some of the clasping embodiments, fitting of PED 555 is snug.

Figure 8C:
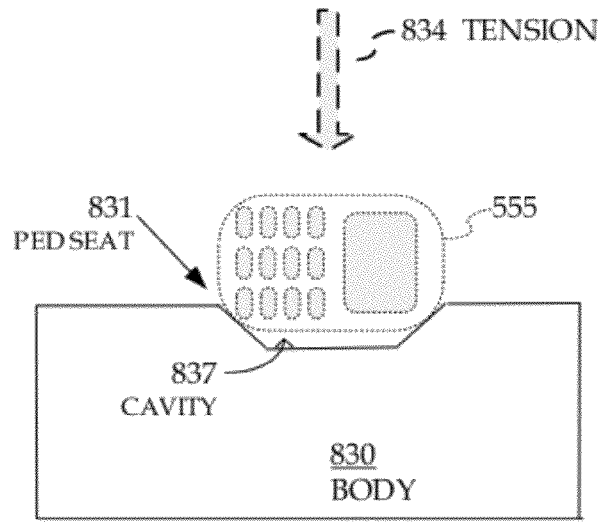
FIG. 8C is a diagram of a station according to embodiments where the body has a cavity for supporting a PED.

FIG. 8C is a diagram of a station body 830 according to an embodiment. Body 830 has a PED seat 831 with a cavity 837 for supporting therein PED 555. Using a cavity has advantages. First, designing with a cavity may make for a simpler embodiment than with the moveable member of FIG. 8B. Second, a cavity provides for more predictability of where PED 555 will end up with respect to body 810, and thus also with respect to where sensor 520 (not shown in FIG. 8B) should be located within body 830. The predictability will be because a first time user is more likely to understand where exactly PED 555 is to be placed. Third, PED 555 will tend to gravitate towards a bottom of cavity 837.

Cavity 837 may be made with any number of shapes. For example, it can be trough shaped, hole shaped, shallow or deep, and so on. An embodiment with a cavity can be made while at the same time supporting the PED therein under tension 837 or not. Plus, a rubber surface can be provided in the interior of the cavity, for supporting thereon PED 555, such as was shown with rubber surface 815.

Figure 8D:
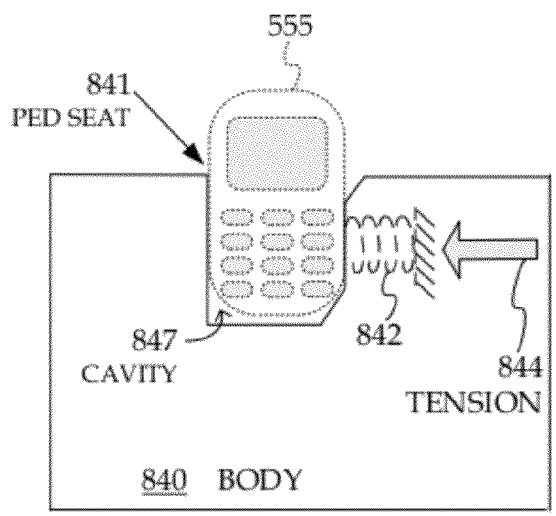
FIG. 8D is a diagram of a station body according to embodiments where the body has a cavity for a PED, and supports it also by tension.

FIG. 8D is a diagram of a station body 840 according to an embodiment. Body 840 has a PED seat 841 for receiving PED 555. Seat 841 includes a cavity 847, for inserting PED 555 therein. Once PED 555 has been inserted in cavity 847, it is held in place also under tension 844, provided by a spring 842. The action of inserting PED 555 in cavity 847 amounts to sheathing it. A part of the cavity has a portion that is movable under tension 844, when PED 555 is inserted or removed. The moveable portion can be made from the same materials that are moveably connected to each other, or flexible materials, and so on.

A design that holds PED 555 in place, such as the design of FIG. 8D, is the preferred embodiment for where the station of the invention may be moved, as is the case when the station will be in a briefcase, in a lady's purse, or in an automobile. Especially in the case of an automobile, body 840 can be integrated with the vehicle, at a location suitable for sheathing by the driver or passengers. The size of the opening of cavity 847 can be initially adjustable, to prepare for different size PEDs, and so on. The placement of spring 842 also reduces how many moving parts are exposed to the user, whose attention may be elsewhere. This design can be implemented together with a charger, or not. If not, it should be noted that PED 555 can be inserted upside down, so as to leave any connections at its underside exposed for charging by other means. Other parts of the station can be implemented by other portions of the automobile, such as the speakers, and so on. In the automobile case, other components of the invention can be integrated with other parts of the automobile.

Figure 8E:
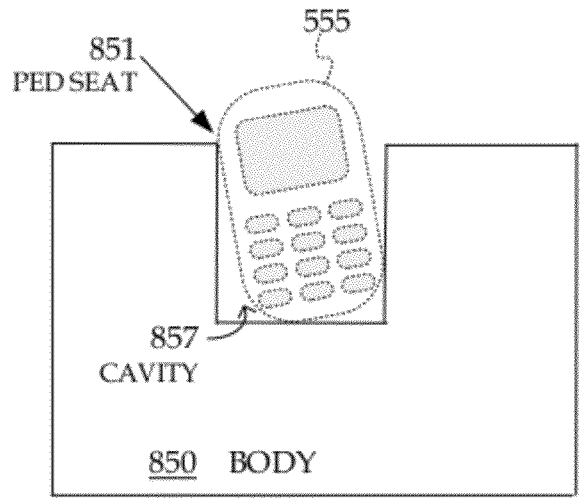
FIG. 8E is a diagram of a station body according to embodiments where the body has a cavity for a PED, and supports it without tension.

FIG. 8E is a diagram of a station body 850 according to an embodiment. Body 850 has a PED seat 851 for receiving PED 555. Seat 851 includes a cavity 857, for inserting PED 555 therein. Once PED 555 has been received in cavity 857, it is supported by its weight, but without tension.

Figure 8F:
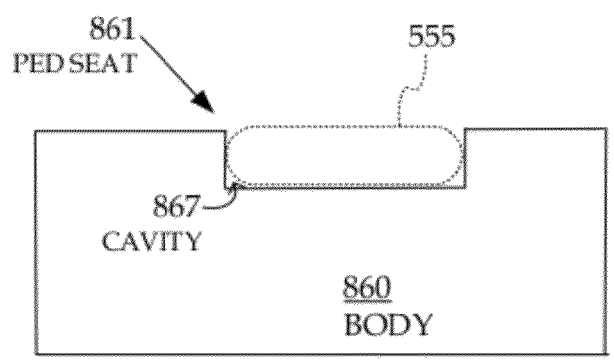
FIG. 8F is a diagram of a station body according to embodiments where the body has a cavity for a PED, and where the cavity has a shape designed to receive the PED snugly.

FIG. 8F is a diagram of a station body 860 according to an embodiment. Body 860 has a PED seat 861 for receiving PED 555. Seat 851 includes a cavity 867, for inserting PED 555 therein. Cavity 867 has a shape that is designed to receive PED 555 snugly. In other words, cavity 867 has a shape that substantially matches a shape of PED 555 enough for a substantially snug fit. The snug fit will make it easier to detect the vibration. However, the shape of cavity 867 preferably does not match the entire perimeter of PED 555, to allow for grasping PED 555, for extracting it from cavity 867.

In some embodiments, the body of a station has at least two mechanical components. One such component is a base, intended for supporting the body in its environment. For example, what was written above for the body being supported on a surface or a wall applies equally well to the base.

The other component is a receptacle, which is adapted for supporting the PED. For example, what was written above for the body supporting the PED applies equally well to the receptacle. For instance, it can have a top surface that is flat or includes a cavity. Or any other shape suitable for receiving PED 555.

The base and the receptacle can be provided in a number of configurations. Two sample such configurations are illustrated.

Referring to FIG. 9, a body 910 has a base 914, and a receptacle 916 that is above base 914. Base 914 is supported on horizontal surface 901. Receptacle 916 is adapted to receive and support PED 555 as per the above. In the example of FIG. 9, receptacle 916 does not include a cavity, but that is only by example, not limitation.

Referring to FIG. 10, a body 1010 has a base 1014, and a receptacle 1016 that is to the side of base 1014. Base 914 is supported on a wall 1001. Receptacle 1016 is adapted to receive and support PED 555 as per the above. In the example of FIG. 10, receptacle 1016 also includes an optional cavity 1017.

Figure 11A:
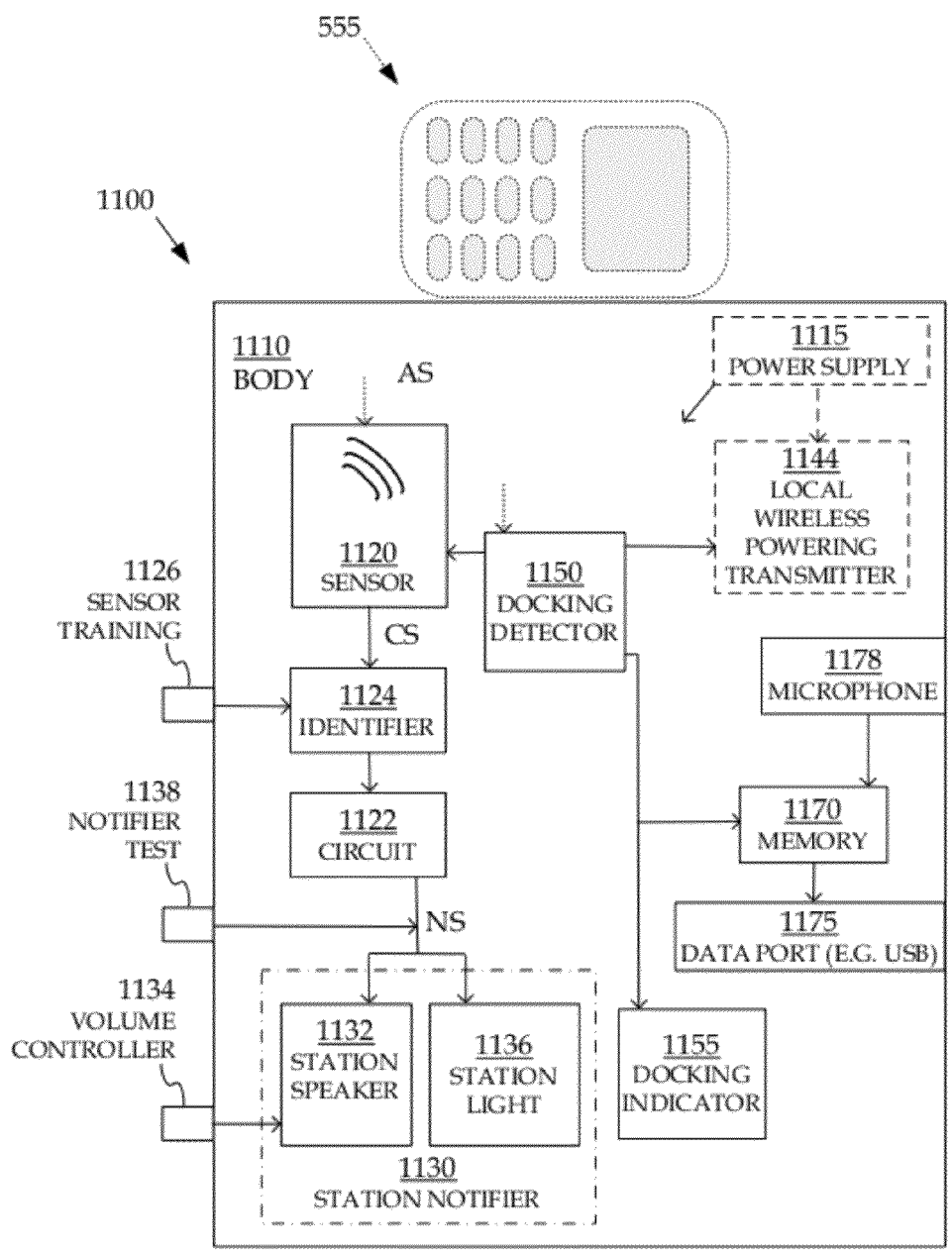
FIG. 11A is a block diagram of components of a station for supporting a PED according to optional embodiments of the invention.

FIG. 11A is a block diagram of components of a station 1100 for supporting PED 555 according to optional embodiments of the invention. Station 1100 includes a body 1110, which can be made as described above for such a body.

Station 1100 includes a sensor 1120, which can be as described for sensor 520, and adapted as necessary for the included optional components. Sensor 1120 generates call signal CS, when it senses the generation of action signal AS.

In addition, station 1100 includes a station notifier 1130, which can be as described for station notifier 530. Notifier 1130 can output a human-perceptible indication responsive to call signal CS.

Station 1100 also optionally includes a power supply module 1115. Module 1115 supplies the electrical power needs of the components seen in FIG. 11A, such as powering an operation of station notifier 1130, and so on. Module 1115 can be implemented within body 1110.

Power supply module 1115 can be implemented in any number of ways, as will be discerned by a person skilled in the art. For example, in some embodiments, module 1115 is a battery, while in others it is a transformer for converting electrical power, such as from a wall outlet to DC.

In some embodiments, station 1100 can also be a station for charging a battery of PED 555. Charging can be wirelessly, or by wires, as will be described in more detail later, with reference to FIG. 11B. Moreover, the charging operation can optionally be combined with an operation of station 1100.

In some embodiments, charging can be wirelessly. Wireless charging is performed by further adapting PED 555 to harvest powering wireless signals, such as RF waves and/or magnetic waves. Embodiments for charging PED 555 wirelessly include a local transmitter of such powering wireless signals. Such a local wireless powering transmitter 1144 can be provided close to station 1100, or within it, and can optionally and preferably be powered by module 1115.

Station 1100 optionally and preferably includes a circuit 1122. Circuit 1122 senses call signal CS, and in response generates a notifier signal NS for driving station notifier 1130. Action signal AS can be internal to circuit 1122.

Circuit 1122 can be made in any way known for circuits, such as with a printed circuit board (PCB), integrated circuit, microprocessor, custom processor, Digital Signal Processing, and the like. In some embodiments, circuit 1122 includes or is provided jointly with others of the components shown in FIG. 11A.

In some embodiments, station 1100 includes an identifier 1124. Identifier 1124 acts as a filter to what sensor 1120 senses, and controls so that the human-perceptible indication is generated from station notifier 1130, but not generated when another event is sensed by sensor 1120. Other such events are thus filtered out, without causing station notifier 1130 to ring when it should not. For example, identifier 1124 can identify whether a signal is a legitimate action signal.

Identifier 1124 may be implemented in a number of different ways. For example, in analog embodiments, it can identify time profiles such as those of FIGS. 5B, 5C, and 5E. A digital embodiment can identify a time profile such as that of FIG. 5D.

In addition, a sensor training actuator 1126 can be provided, which can be actuated when PED 555 is supported and vibrating. Actuator 1126 informs identifier 1124, or circuit 1122, when a legitimate event is indeed taking place, for the device to be trained. For example, if identifier 1124 is indeed used, it can adjust its pass bandwidth towards a frequency component with the largest amplitude. This way, other events will be excluded more reliably, and false notifications will be prevented. In operation, PED 555 can be supported by body 1110, and called. While ringing or vibrating, sensor training actuator 1126 can be actuated. If sensor training actuator 1126 is indeed provided, it can be marked with the designation "SET", or "SET FOR DEVICE", etc.

In addition, un-training can be provided for identifier 1124, for the reverse operation of sensor training actuator 1126. This can be a different actuator, which can be marked as "RESET", and so on.

Station 1100 optionally also includes a station notifier testing actuator 1138. This can be an actuator for the user to test whether station notifier 1130 works. So, station notifier testing actuator 1138 can cause the human-perceptible indication to be generated when the PED mechanism is not sensed by sensor 1120 as operating. In some embodiments that is while PED 555 is supported by body 1110, or even if no PED is supported by body 1110. In the preferred embodiment, station notifier testing actuator operates by simulating or duplicating notifier signal NS.

Station notifier 1130 operates responsive to call signal CS, or its derivative notifier signal NS, when PED 555 is sensed as vibrating or ringing. Station notifier 1130 can be made in any number of ways.

In some embodiments, station notifier 1130 includes a station speaker 1132, which generates a call sound as its human-perceptible indication. The call sound can be akin to a ring tone for cell phones, be programmable, and so on. It is preferred that the human-perceptible indication be approximately as loud as that of a telephone of a home or an office, since station 1100 is to support PED 555 at a home or office.

Station 1100 optionally also includes a volume controller 1134, for adjusting a volume of the call sound. Volume controller 1134 can be a knob that controls station speaker 1132. It is preferred to set this while operating station notifier testing actuator 1138.

Volume controller 1134 can have a setting all the way down to zero volume. In addition, or alternately, a disable switch can be provided for station speaker 1132. This way, office environments can be accommodated with no sound. In such embodiments, it is preferred that station notifier 1130 had another ways of notifying the user. The disable switch can be a switch that is set once for all calls. Alternately, it can be used for discontinuing the notification for a single call, if it is desired to ignore it, and in which case station speaker 1132 would again emit a sound to notify the user for the next call.

In some embodiments, station notifier 1130 includes a station light 1136, which generates a light signal as its human-perceptible indication. This is preferred for environments where ringing is not desired, such as offices. This is also preferably provided for stations that are for multiple PEDs, as will be seen below, so that someone responding to a call can tell more quickly which of the PEDs rang.

In some embodiments, station notifier 1130 includes both a volume controller 1134, and a station light 1136. In addition, it can include a switch to decide which of them is to notify, and so on.

Station 1100 furthermore optionally includes a docking detector 1150. Docking detector 1150 can detect that PED 555 is indeed supported by body 1100. Docking detector 1150 can be implemented in any suitable way, such as with a pressure sensor, a proximity detector, a detector of RF emitted by PED 555 when it is on, and so on. In addition, docking detector 1150 can be implemented by a switch that is normally in a first state when PED 555 is not supported by the body, and is at a second state when PED 555 is supported by the body. For example, it can be normally open when PED 555 is not supported by the body, and close when PED 555 is supported by the body, or vice versa. For example, the switch can close between a receptacle and a base, or close when PED 555 is placed in a cavity, for example if a bottom panel of the cavity is moveable, and so on.

In embodiments where PED 555 has been made so as to cooperate with station 1100, docking detector 1150 can even be activated by a specific signal from PED 555, which can be a docking signal. What is written above for the nature of the action signal can also apply to such a docking signal. For example, it can be a signal sensed from a prior art PED, or a custom docking signal, and so on.

An output of docking detector 1150 can control when station notifier 1130 generates the human-perceptible indication. Accordingly, in some embodiments, station notifier 1130 cannot generate the human-perceptible indication unless docking detector 1150 detecting that PED 555 is supported by body 1110.

Station 1100 additionally optionally includes a docking indicator 1155. Docking indicator 1155 can be actuated when docking detector 1150 detects that PED 555 is supported by body 1100. Docking indicator 1155 can be a light, emitting light when actuated, or a speaker, emitting a sound when actuated.

In some embodiments, docking indicator 1155 can be implemented by station notifier 1130 itself. In other words, station notifier 1130 also doubles as docking indicator 1155, whether it is implemented by speaker 1132, station light 1136, or both. More particularly, station notifier 1130 is operable to generate the human-perceptible indication also responsive to the docking detector detecting that the PED is supported by the body. The human-perceptible indication can be the same indication or different, from when the PED mechanism is being used. For example, if speaker 1132 is used also this way, it can ring only once, briefly, and not very loudly, upon docking PED 555 at it.

Docking indicator 1155 is intended to provide comfort to the user, who will observe that station 1100 detects immediately that PED 555 has been placed there. This way, the user will have more trust that station 1100 works, and will rings or vibrate, when PED 555 receives a call.

While detecting that PED 555 is supported by body 1100, docking indicator 1155 ran operate in a number of ways. In some embodiments, it can operate continuously. For example, if it includes a light, it can emit light continuously. In other embodiments, docking indicator 1155 can operate for a short time, responsive to detecting that the PED has started being supported by the body. But then docking indicator 1155 can stop operating. For example, a speaker can be used to emit a brief sound, or a light can blink a few times. This can serve as adequate confirmation to the user that PED 555 has been docked. If docking indicator 1155 has stopped operating, then it might again operate briefly as PED 555 is being removed.

In addition, if local wireless powering transmitter 1144 is indeed implemented, it can operate responsive to docking detector 1150 detecting that PED 555 is supported by the body.

Station 1100 moreover optionally includes a memory 1170, as mentioned above. Memory 1170 can store instructions as to how station 1100 is to operate, data from its operation, and so on. Memory 1170 can be implemented in any number of ways. For example, it can be part of the memory of a processor that operates the functions of station 1100. Or it can be implemented separately from such a processor.

Station 1100 additionally optionally includes a data port 1175. Data port 1175 can be for wired transfer of data, such as a USB port. Or it can be for wireless transfer of data. Data port 1175 can be used for exporting data stored in memory 1170, receiving data that is to be stored in the memory, or both.

In some embodiments, memory 1170 can store data relative to the docking detector 1150 detecting that PED 555 is supported by the body. For example, it can store times at which PED 555 was docked and undocked on station 1100, whether it was recognized as a PED pre-matched to station 1100, the times a call was received, e.g. by sensing notifier signal NS, and so on.

In some embodiments, memory 1170 can store sound data, for later reproduction by a speaker of station 1100, to notify of a call received. That speaker can be speaker 1132 or a different speaker. Such sound data can be a custom ring tone. The sound data can be imported electronically through data port 1175, or via a microphone 1178, which can convert a received sound message to sound data.

FIG. 11B is a block diagram of components of a station 1180 for supporting another PED 1190, according to other optional embodiments of the invention. Station 1180 includes a body 1182, which can be made as described above for body 1110. In addition, station 1180 includes many components made as was described above with reference to FIG. 11A. What is different is that PED 1190 is being charged by wires, not wirelessly. In this embodiment, station 1180 has been combined with an adapter. Power supply module 1115 is implemented by a transformer that is adapted to advantageously both power station 1100 and charge PED 1190.

Body 1182 defines a seat 1181. Station 1180 can include conductor contacts for a PED that is in seat 1181. Of those, conductor contacts 1185 are for powering PED 1190, and optional conductor contact 1187 can be for communicating other information with it, such as action signal AS, a docking signal, and so on. As PED 1190 is docked at station 1180, the conductor contacts of station 1180 can make mating connection with respective conductor contacts 1195, 1197 of PED 1190. The connection can be made the same way as when a PED is plugged into its charger.

Power supply 1115 feeds power to PED 1190 through conductor contacts 1185 and 1195. In addition, station 1180 optionally includes charging switch 1184. Charging switch 1184 may be controlled as is desired, for example by docking detector 1150.

A station according to embodiments is an accessory for a PED, in the same way that a charger is an accessory. In fact, in some embodiments, the station is integrated with the charger, as seen above.

In some embodiments, a station according to embodiments is not matched to work with a specific PED, such as PED 555. It is generic, and can work with a variety of PEDs. In addition, an identifier such as identifier 1124 can help train the station for that matching.

In other embodiments, a station according to embodiments is prematched to work with a specific PED, such as 555. The prematched station can be sold together with the PED, as an accompanying accessory. In others, it can designate which PED(s) it supports, for users to purchase.

Prematching can be either mechanical, or electrical, or both. Mechanical prematching can be, for example, by the shape of a cavity, for receiving the PED. Electrical prematching means that the identifier is attuned in advance, and so on.

More features can be added this way. For example, if a station is prematched to a specific PED, and a different PED is inserted, the station can give an appropriate notification, and so on.

Operations of the invention are now described.

Figure 12A:
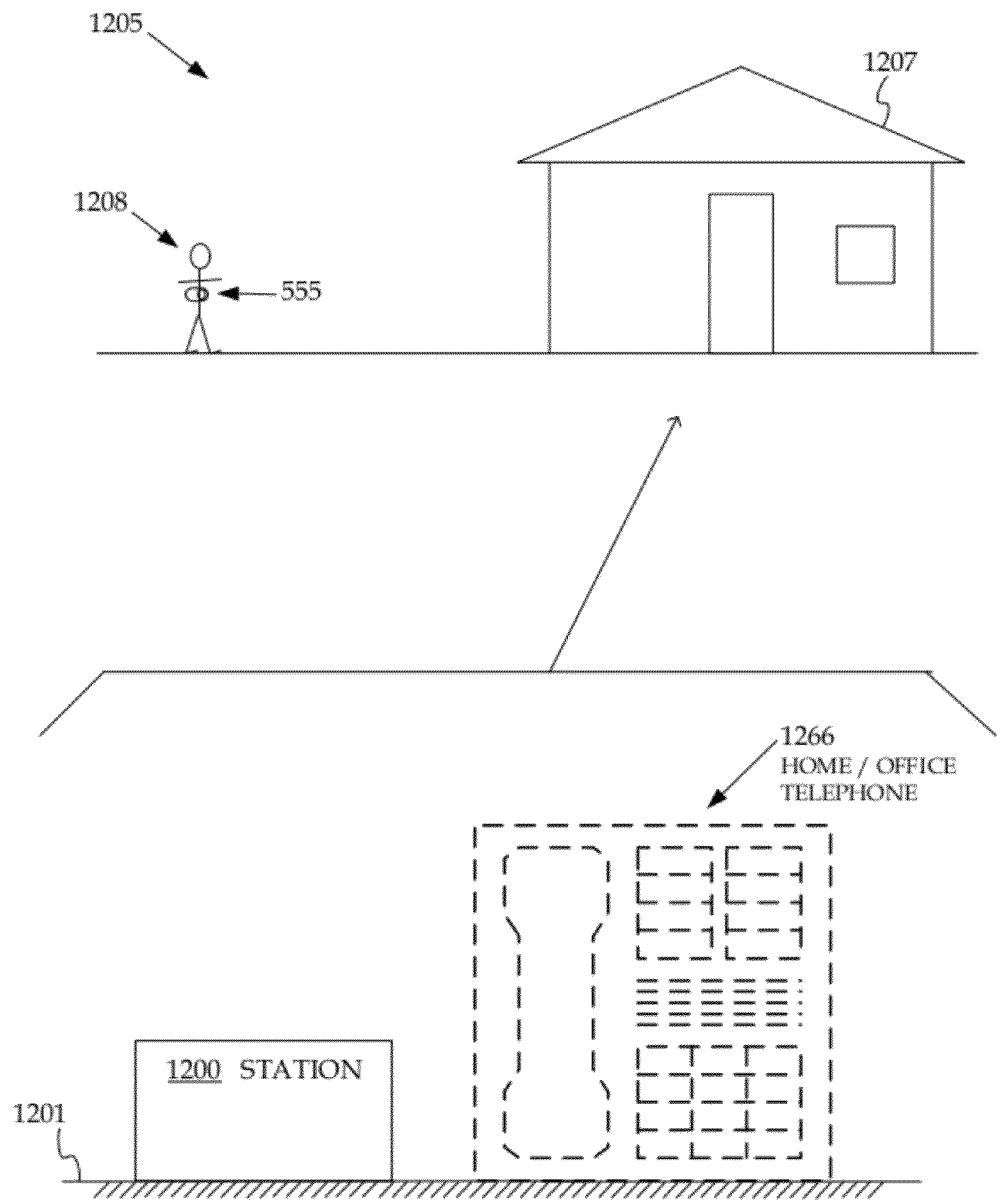
FIG. 12A is a diagram of a scene where a user is away from a building, and carries a PED upon their person.

FIG. 12A is a diagram of a scene 1205. A user 1208 is away from a building 1207, which could be their home or office. User 1208 carries PED 555 upon their person, and can thus receive calls.

As seen in the detail, in building 1207 there is a surface 1201, such as the top of a table, a counter, etc. A station 1200 made according to embodiments is on surface 1201. In addition, an optional telephone 1266 is provided on surface 1201, which uses a land line for its connection. FIG. 12A shows telephone 1266 as optional, to better illustrate how, in certain circumstances, it is rendered obsolete by the present invention.

In FIG. 12A, while user 1208 is away from building 1207, he does not need telephone 1266, or its land line, at least for voice communication. If telephone 1266 is indeed provided, it can receive calls, but the user will not be there to take them. Telephone 1266 can receive messages, as can PED 555.

Figure 12B:
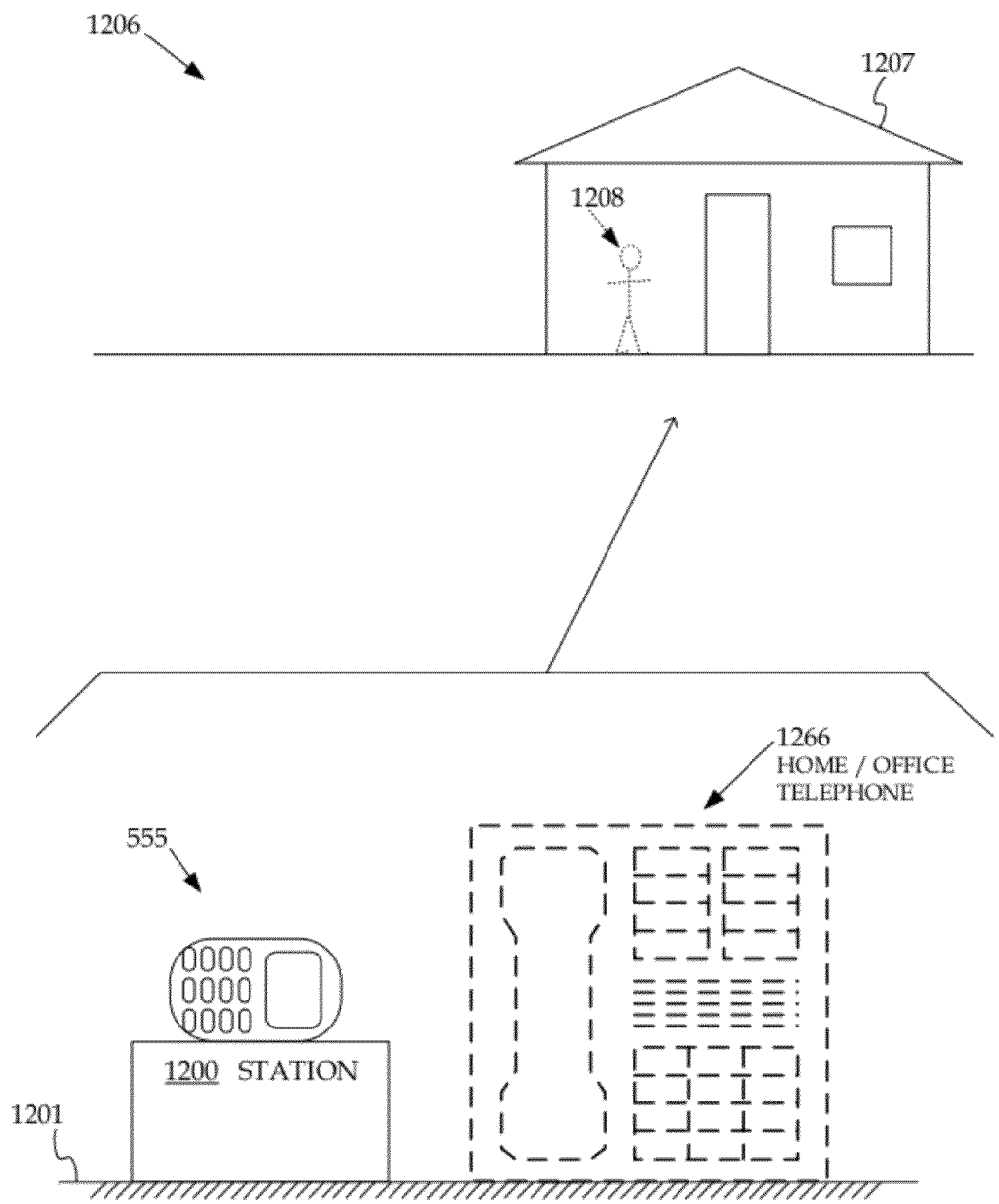
FIG. 12B is a diagram of a scene where a user is in the building of FIG. 12A, and has left their PED on a station with the components of the station of FIG. 5A.

FIG. 12B is a diagram of a scene 1206. Scene 1206 is similar to scene 1205, except that user 1208 is now in building 1207. PED 555 is now supported on station 1200, and can thus receive calls. Plus, because of station 1200, user 1208 can hear PED 555 ring, even if user 1208 has stepped to the next room, depending on the setting of volume controller 1134. If station 1200 has been placed at a central location within the premises of building 1208, its ringing may cover the entire premises. This, without the user needing to carry PED 555 on their person while at the premises.

In FIG. 12B, user 1208 can also receive a telephone call at telephone 1266, instead of at PED 555. Telephone 1266 adds value to the user where the premises are large, by ringing at multiple locations. And, for that additional value, the user pays every month for the cost of the land line.

Accordingly, as mentioned above, some users can save on monthly fees. More particularly, if they live in modest-sized premises, they need purchase station 1200 once for their PED. Then they can discontinue the land line for voice purposes.

The operation of station 1200 is now examined in more detail, in the event a wireless signal is received by PED 555 supported thereon.

Figure 13:
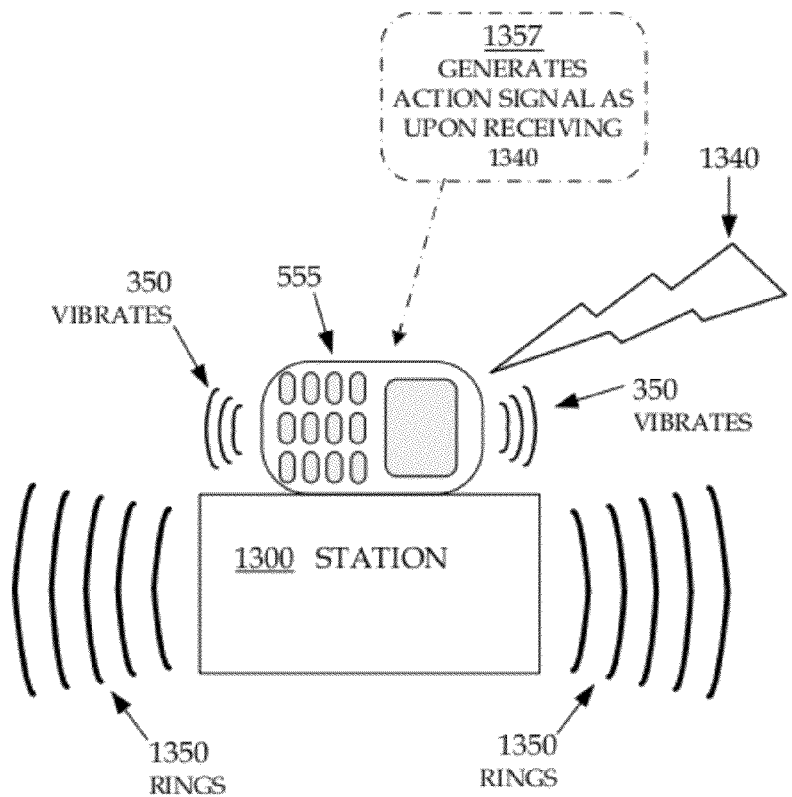
FIG. 13 is the diagram of an embodiment of the station of FIG. 12B, except the supported PED is also receiving a wireless signal and vibrating because of it.

FIG. 13 is the diagram of a station 1300 according to an embodiment of station 1200 of FIG. 12B, and in the same situation, except supported PED 555 is also receiving a wireless signal 1340, and vibrates 350 because of it. According to a comment 1357, an action signal AS is generated upon receiving wireless signal 1340. In the example of FIG. 13, station 1300 can sense the generation of action signal AS, and therefore rings 1350, for example as if it were a home telephone.

Figure 14:
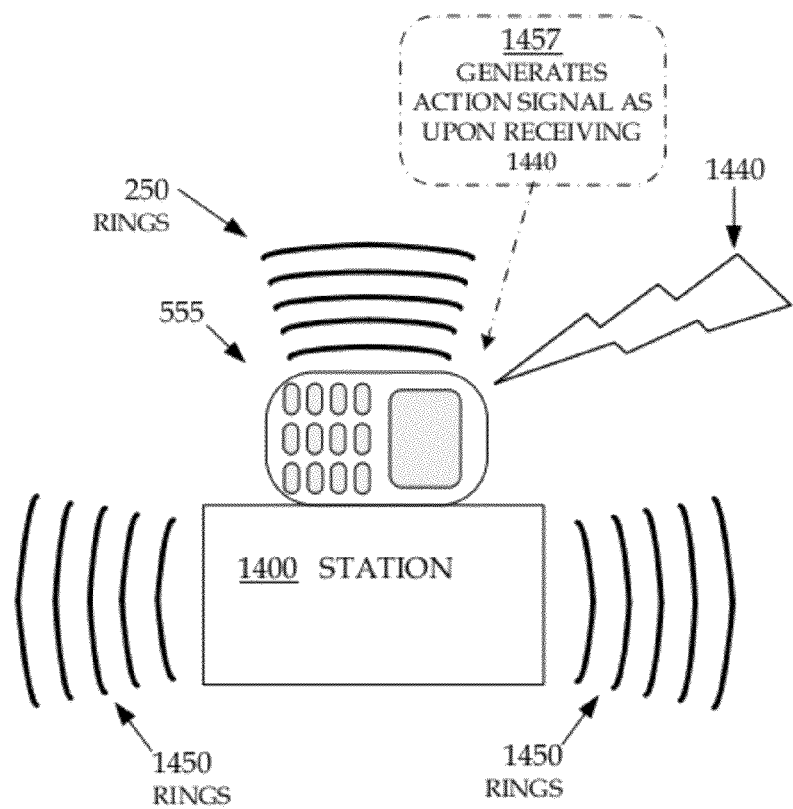
FIG. 14 is the diagram of an embodiment of the station of FIG. 12B, except the supported PED is also receiving a wireless signal and ringing because of it.

FIG. 14 is the diagram of a station 1400 according to an embodiment of station 1200 of FIG. 12B, and in the same situation, except supported PED 555 is also receiving a wireless signal 1440, and rings 250 because of it. According to a comment 1457, an action signal AS is generated upon receiving wireless signal 1440. In the example of FIG. 14, station 1400 can sense the generation of action signal AS, and therefore again rings 1450, for example as if it were a home telephone.

Figure 15:
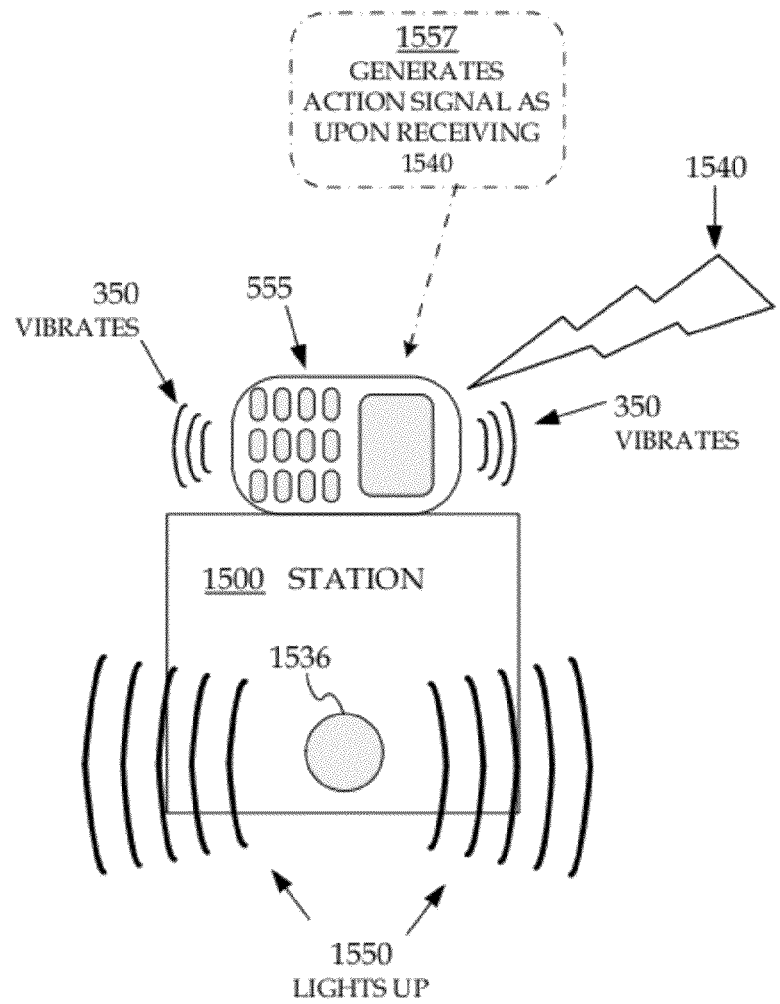
FIG. 15 is the diagram of an embodiment of the station of FIG. 12B, except the supported PED is also receiving a wireless signal and vibrating because of it.

FIG. 15 is the diagram of a station 1500 according to an embodiment of station 1200 of FIG. 12B, and in the same situation, except supported PED 555 is also receiving a wireless signal 1540, and vibrates 350 because of it. According to a comment 1557, an action signal AS is generated upon receiving wireless signal 1540. In the example of FIG. 15, the station notifier of station 1500 is a station light 1536. Station 1500 can sense the generation of action signal AS, and therefore station light 1536 provides a light signal by lighting up 1550.

Figure 16:
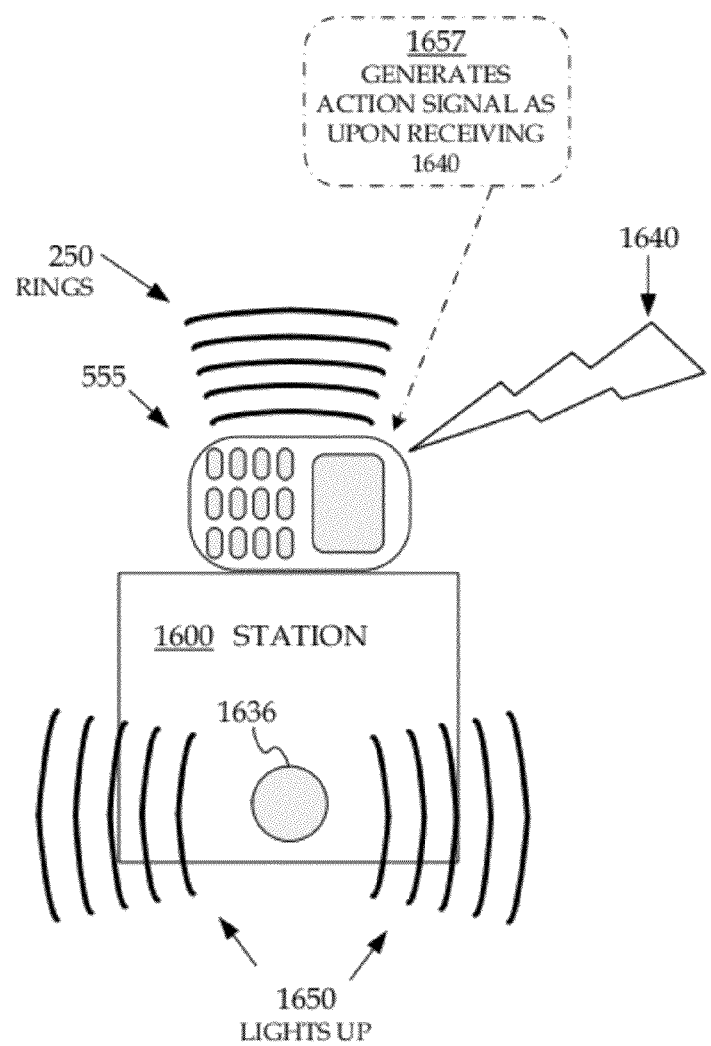
FIG. 16 is the diagram of an embodiment of the station of FIG. 12B, except the supported PED is also receiving a wireless signal and ringing because of it.

FIG. 16 is the diagram of a station 1600 according to an embodiment of station 1200 of FIG. 12B, and in the same situation, except supported PED 555 is also receiving a wireless signal 1640, and rings 250 because of it. In the example of FIG. 16, the station notifier of station 1600 is a station light 1636. According to a comment 1657, an action signal AS is generated upon receiving wireless signal 1640. Station 1600 can sense the generation of action signal AS, and therefore station light 1636 provides a light signal by lighting up 1650.

Figure 17:
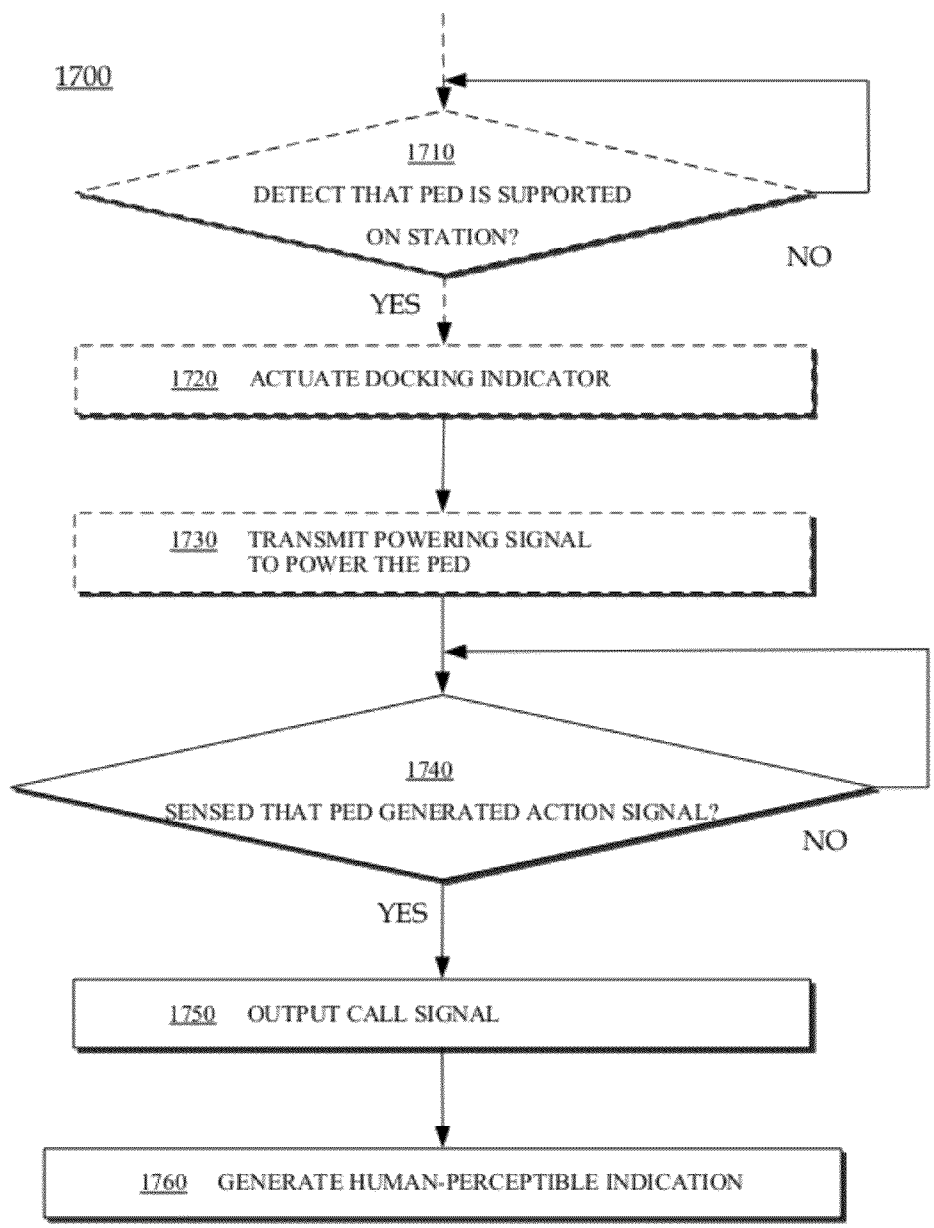
FIG. 17 is a flowchart illustrating methods according to embodiments.

FIG. 17 shows a flowchart 1700 for describing a method for a station. The method of flowchart 1700 may also be practiced by physical embodiments described above, e.g. station 500, station 1100, and so on.

According to an optional operation 1710, it is detected whether a PED is supported by the station. If not, the process repeats, until there is such detection. If or when there is such detection, according to an optional next operation 1720, a docking indicator is actuated in response to the detection. As mentioned also above, such a docking indicator can be audible or visible when actuated.

According to an optional operation 1730, a powering signal is transmitted to power the PED. The powering signal is wired or wireless. In the preferred embodiment, operation 1730 is performed only when operation 1710 detects that a PED is supported by the station, and responsive to it.

According to an operation 1740, it is sensed whether a Portable Electronic Device (PED) has generated an action signal, in response to the PED receiving a wireless signal. The wireless signal would be received from a transmitter at least 500 ft away from the station, and can be in conjunction with receiving a telephone call or a text message. If not, the process repeats, until there is such sensing. Operation 1740 can be implemented in any number of ways. For example, sensing can include signals emitted from prior art PEDs, or custom signals from PEDs according to embodiments.

According to a next operation 1750, a call signal is outputted responsive to the sensing of operation 1740.

According to a next operation 1760, a human-perceptible indication is generated responsive to the call signal. The human-perceptible indication can be a call sound, a light signal, both, and so on. In some embodiments, the human-perceptible indication is generated only while the PED is detected as supported by the station, as per optional operation 1710.

Operations of a PED according to embodiments include generating an action signal in a way that can be sensed by a station according to embodiments. The action signal can encode a message that is intended to control the station, or activate custom features in it, or identify the PED to the station. In addition, a PED can transmit a docking signal to inform the station of its proximity and so on.

Moreover, the station can transmit station signals to the PED. These station signals can be for status, for identifying, and so on. For example, a PED that knows, from station signals, that it is docked, need not ring at all, upon receiving a call, and so on.

In all of the above embodiments, a single PED 555 was shown hosted or docked on a single device. It should be appreciated that a user might try to host or dock multiple PEDs on a single station made according to the invention.

Some stations according to the invention are made expressly for a single PED. These are called single-seat, or one-seat, or one-seater. Other stations are made according to embodiments for multiple PEDs, and can be called a two-seater, four-seater, multi-seater, and so on. Seats can be designed so that each is intended nominally for one PED. But there is no requirement that seats be designated, or that a station according to the invention indicate how many PEDs it is designed for. Plus, for purposes of describing multiple PEDs at a station, the above mentioned PED 555 can be termed even more particularly the first PED, and any additional PEDs can be accordingly termed the second PED, third PED, and so on.

Figure 18:
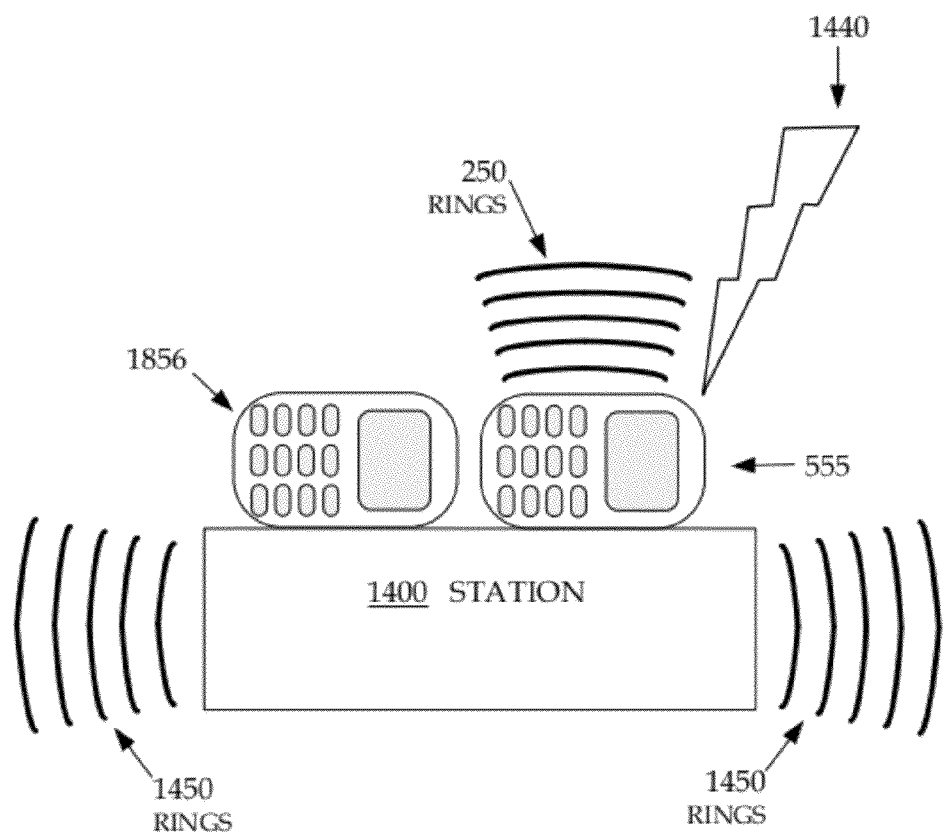
FIG. 18 is a diagram of the embodiment of FIG. 14, which is being used to support concurrently two PEDs.

FIG. 18 repeats the diagram of the embodiment of FIG. 14, but which being used to support PED 555, along with one more PED 1856 at the same time. Station 1400 may be either a single-seater, or a multiple seater, or not have seats designated at all. Even if station 1400 is expressly a single seater, a user might simply try to host in the single seat two PEDs, namely PED 555 together with PED 1856.

In the diagram of FIG. 18, PED 555 is receiving wireless signal 1440, and rings 250 because of it. It also generates an action signal. In the example of FIG. 18, station 1400 can sense the generation of the action signal, and therefore again rings 1450, for example as if it were a home telephone. Upon getting there, a person summoned will often be able to tell which of PEDs 555 and 1856 is indeed the one ringing.

In addition, multiple-seater stations can be implemented according to embodiments, for expressly hosting multiple PEDs instead of just one. In such embodiments, the aspects included above for notifying that the first PED is using its PED mechanism can be either replicated or shared for use for notifying about the additional docked PEDs.

In multi-seater embodiments, the body can be adapted to host the additional PEDs. For example, it can have individualized spaces, or seats, for receiving the PEDs. Designations can be added to indicate the seats, if desired. The designations can be with writing. A docking detector can be provided for each seat, or a single docking detector 1150 can be used for PEDs in more than one of the seats. A docking indicator can be provided for each seat, or a single docking indicator can be used to indicate that there is one PED in at least one of the seats.

In multi-seat embodiments, a sensor such as sensor 1120 can be shared, or there can be sensors for the PED of each seat. An identifier such as identifier 1124 can be shared, or there can be sensors for the PED of each seat. Or a single identifier 1124 can instead be attuned to recognize the generation of more than one action signals. Attuning can be from the factory, or by training A sensor training actuator such as actuator 1126 can be provided for multiple identifiers, or for multiple training of an identifier that can recognize the generation of more than one action signals. A circuit such as circuit 1122 can be shared, or there can be circuits for the PED of each seat.

In multi-seat embodiments, a station notifier such as station notifier 1130 can be shared, shared in part, or there can be station notifiers for the PED of each seat. A station light such as station light 1136 can be shared, or there can be station lights for the PED of each seat. A station speaker such as station speaker 1132 can be shared, or there can be station speakers for the PED of each seat. The human-perceptible indication emitted from the one or more station notifiers can be the same or different for the different PEDs vibrating or ringing.

An example of an expressly multi-seat embodiment is now described.

FIG. 19A is a diagram of a sample four-seat embodiment, where a station 1900 has a body 1910. Station 1900 is suitable for accommodating four PEDs, by having four seats 1911A, 1911B, 1911C, 1911D in body 1910. Seats 1911A, 1911B, 1911C, 1911D also have cavities, as is preferred, but not necessary. In addition, means for applying tension can be used in conjunction with seats 1911A, 1911B, 1911C, 1911D, and so on.

FIG. 19A is further a snapshot of where a PED 1955A is in seat 1911A, a PED 1955D is in seat 1911D, and a PED 1955B has just been placed in seat 1911B, as indicated by an arrow. Station 1900 includes station lights 1936A, 1936B, 1936C, 1936D for PEDs in seats 1911A, 1911B, 1911C, 1911D, respectively. Station light 1936B is lit, because PED 1955B is just being placed in seat 1911B. Station light 1936B will stop being lit after a few seconds, in this embodiment.

Station 1900 also includes a station speaker 1932 that corresponds to PEDs in all four seats. In the snapshot of FIG. 19A, speaker 1932 is silent. In another embodiment, speaker 1932 might emit an audible message acknowledging that PED 1955B is just being placed in seat 1911B.

FIG. 19B is a diagram of station 1900 of FIG. 19A, at a later time. PED 1955D, docked in seat 1911D, is receiving a call, and is ringing 250. Station light 1936D is lit, for example blinking, and station speaker 1932 is ringing 1950. A user might hear ringing 1950 and approach. Then they can see that it is station light 1936D that is lit, and will therefore know that PED 1955D is the one receiving the call.

Multi-seat embodiments may have isolation between the seats, so that the sensor or one seat will not be affected by the action signal of a PED is a neighboring seat. But isolation may not be necessary if all sensors operate at once, and the one with the strongest signal is deemed to be the one that is sensing the legitimate call.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The invention claimed is:

1. A station configured to cooperate with a Portable Electronic Device (PED) distinct from the station, the PED including an antenna operable to receive a wireless signal from a remote transmitter at least 500 feet away from the PED, the PED further able to generate internally an action signal responsive to receiving the wireless signal, the action signal not being human perceptible, the action signal encoding a message, the station comprising:
   a body configured to support the PED;
   a sensor configured to sense the generation of the action signal; and
   a station notifier configured to generate responsive to the action signal a human-perceptible indication when the encoded message meets a preset criterion, but not when the encoded message does not meet the preset criterion;
   wherein the station does not provide a communication pathway between the PED and any and all networks.

2. The station of claim 1, in which
   the wireless signal is received in conjunction with receiving a telephone call.

3. The station of claim 1, in which
   the wireless signal is received in conjunction with receiving a text message.

4. A station configured to cooperate with a Portable Electronic Device (PED) distinct from the station, the PED including an antenna operable to receive a wireless signal from a remote transmitter at least 500 feet away from the PED, the PED further able to generate internally an action signal responsive to receiving the wireless signal, the action signal not being human perceptible, the action signal encoding a message, the station comprising:
   a body configured to support the PED;

a sensor configured to sense the generation of the action signal; and a station notifier configured to generate responsive to the action signal a human-perceptible indication when the encoded message meets a preset criterion, but not when the encoded message does not meet the preset criterion;

a mechanism for transferring energy to the battery of the PED when the PED is supported on the body;

wherein:

the energy is transferred to the battery of the PED wirelessly, the battery of the PED is configured to present an input impedance when the energy is thus being transferred to it, and the action signal is configured to cause a modulation to the input impedance.

5. The station of claim 4, in which the energy is transferred to the battery of the PED via conductors.

6. The station of claim 5, in which the battery of the PED is configured to present an input impedance when the energy is thus being transferred to it, and the action signal is configured to cause a modulation to the input impedance.

7. The station of claim 1, further comprising the station in combination with the PED.

8. A station configured to cooperate with a Portable Electronic Device (PED) distinct from the station, the PED further able to generate internally a wireless action signal responsive to receiving a wireless signal from a network, the action signal not being human perceptible, the action signal encoding a message, the station comprising:

a receiver configured to sense the wireless action signal; and a signaling device configured to generate an alert signal including sound and/or a light responsive to the receiver when the encoded message meets a preset criterion, but not when the encoded message does not meet the preset criterion;

wherein the station does not provide a communication pathway between the PED and any and all networks.

9. The station of claim 8, wherein the preset criterion is a format and/or content of the encoded message.

10. The station of claim 8, wherein the encoded message is one of a plurality of possible messages, and the alert signal is different for at least some of the possible messages.

11. A station configured to cooperate with a Portable Electronic Device (PED) distinct from the station, the PED further able to generate internally a wireless action signal responsive to receiving a wireless signal from a network, the action signal not being human perceptible, the action signal encoding a message, the station comprising:

a receiver configured to sense the wireless action signal; and a signaling device configured to generate an alert signal including sound and/or a light responsive to the receiver when the encoded message meets a preset criterion, but not when the encoded message does not meet the preset criterion;

the receiver being configured to receive another encoded message representing at least in part that the PED needs to be charged;

the signaling device being configured to generate an alert signal including sound and/or a light responsive to the receiver sending the another encoded message.

12. The station of claim 8, further comprising the station in combination with the PED.

13. A station configured to cooperate with a Portable Electronic Device (PED) distinct from the station, the PED further able to generate internally a wireless action signal responsive to receiving a wireless signal from a network, the action signal not being human perceptible, the action signal encoding a message, the station comprising:

means for receiving the wireless action signal; and means for generating an alert signal including sound and/or a light, responsive to receipt of the wireless action signal by the means for receiving, when the encoded message meets a preset criterion, but not when the encoded message does not meet the preset criterion;

wherein the station does not provide a communication pathway between the PED and any and all networks.

14. The station of claim 13, wherein the preset criterion is a format and/or content of the encoded message.

15. The station of claim 13, wherein the encoded message is one of a plurality of possible messages, and the alert signal is different for at least some of the possible messages.

16. A station configured to cooperate with a Portable Electronic Device (PED) distinct from the station, the PED further able to generate internally a wireless action signal responsive to receiving a wireless signal from a network, the action signal not being human perceptible, the action signal encoding a message, the station comprising:

means for receiving the wireless action signal; and means for generating an alert signal including sound and/or a light, responsive to receipt of the wireless action signal by the means for receiving, when the encoded message meets a preset criterion, but not when the encoded message does not meet the preset criterion;

the means for receiving comprising means for receiving another encoded message representing at least in part that the PED needs to be charged;

the means for generating being configured to issue an alert signal including sound and/or a light responsive to the receiver receiving the another encoded message.

17. The station of claim 1, wherein the PED generates internally an action signal responsive to receiving the wireless signal when the PED is set to a non-audio ringing mode.

18. The station of claim 8, wherein the PED generates internally an action signal responsive to receiving the wireless signal when the PED is set to a non-audio ringing mode.

19. The station of claim 13, wherein the PED generates internally an action signal responsive to receiving the wireless signal when the PED is set to a non-audio ringing mode.

* * * * *

UNITED STATES PATENT AND TRADEMARK OFFICE
CERTIFICATE OF CORRECTION

PATENT NO.      : 8,583,144 B2                                  Page 1 of 1
APPLICATION NO. : 13/302897
DATED           : November 12, 2013
INVENTOR(S)     : Gregory T. Kavounas It is certified that error appears in the above-identified patent and that said Letters Patent is hereby corrected as shown below:

IN THE SPECIFICATIONS:

In Column 3, Line 59, delete "is the" and insert -- is a --, therefor.

In Column 3, Line 62, delete "is the" and insert -- is a --, therefor.

In Column 3, Line 65, delete "is the" and insert -- is a --, therefor.

In Column 4, Line 1, delete "is the" and insert -- is a --, therefor.

In Column 6, Line 6, delete "detector 520." and insert -- detector 1150. --, therefor.

In Column 6, Line 66, delete "ionically" and insert -- iconically --, therefor.

In Column 7, Line 54, delete "tension 837" and insert -- tension 834 --, therefor.

In Column 10, Line 50, delete "body 1100." and insert -- body 1110. --, therefor.

In Column 11, Line 12, delete "body 1100." and insert -- body 1110. --, therefor.

In Column 11, Line 32, delete "body 1100," and insert -- body 1110, --, therefor.

In Column 11, Line 33, delete "ran" and insert -- can --, therefor.

In Column 13, Line 16, delete "building 1208," and insert -- building 1207, --, therefor.

In Column 15, Line 35, delete "training A" and insert -- training. A --, therefor.

Signed and Sealed this
Twentieth Day of May, 2014

Michelle K. Lee
*Deputy Director of the United States Patent and Trademark Office*